US009439123B2

(12) United States Patent
Matsuo et al.

(10) Patent No.: US 9,439,123 B2
(45) Date of Patent: Sep. 6, 2016

(54) BASE STATION, RADIO COMMUNICATION SYSTEM, AND HANDOVER METHOD

(71) Applicant: Panasonic Intellectual Property Corporation of America, Torrance (JP)

(72) Inventors: Hidenori Matsuo, Kanagawa (JP); Takahisa Aoyama, Kanagawa (JP); Hong Tat Toh, Singapore (SG); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 25 days.

(21) Appl. No.: 14/092,597

(22) Filed: Nov. 27, 2013

(65) Prior Publication Data

US 2014/0087732 A1 Mar. 27, 2014

Related U.S. Application Data

(63) Continuation of application No. 12/865,651, filed as application No. PCT/JP2008/003665 on Dec. 9, 2008, now Pat. No. 8,626,173.

(30) Foreign Application Priority Data

Feb. 1, 2008 (JP) ................................. 2008-023207
Apr. 30, 2008 (JP) ................................. 2008-118558

(51) Int. Cl.
*H04W 36/30* (2009.01)
*H04W 36/38* (2009.01)
(Continued)

(52) U.S. Cl.
CPC .......... *H04W 36/30* (2013.01); *H04J 11/0069* (2013.01); *H04W 36/38* (2013.01); *H04W 36/0083* (2013.01); *H04W 84/105* (2013.01)

(58) Field of Classification Search
CPC ............... H04W 36/30; H04W 36/38; H04W 36/0083; H04W 84/105; H04J 11/0069
USPC .................. 455/436–444, 448–449; 370/331
See application file for complete search history.

(56) References Cited

U.S. PATENT DOCUMENTS

2003/0048763 A1   3/2003 Kondo
2005/0143072 A1*  6/2005 Yoon ..................... H04W 36/12
                                                              455/436

(Continued)

FOREIGN PATENT DOCUMENTS

CN   1146271 A   3/1997
CN   1930828 A   3/2007

(Continued)

OTHER PUBLICATIONS

Japanese Office Action dated Jul. 30, 2013, for JP Application No. 2012-129472, 4 pages.

(Continued)

*Primary Examiner* — Michael Mapa
(74) *Attorney, Agent, or Firm* — Seed IP Law Group PLLC

(57) ABSTRACT

When a handover request for performing a handover of a terminal (70) from a macro cell C1 to a CSG cell C2 is received from an SeNB 10 (S8), a base station (TeNB) (40) of the CSG cell C2 transmits a handover response in accordance with a handover enabled/disabled state (S12). The handover response includes an identifier of the terminal (70) in the CSG cell C2. Upon receiving the response, the SeNB (10) notifies the identifier to the terminal (70) (S14). The TeNB (40) repeatedly transmits a dedicated signal containing a handover command via a dedicated channel set using the identifier at an interval shorter than a gap period (S18). Accordingly, whether or not access is permitted can be judged promptly and a smooth handover can be realized.

16 Claims, 32 Drawing Sheets

(51) Int. Cl.
*H04J 11/00* (2006.01)
*H04W 84/10* (2009.01)
*H04W 36/00* (2009.01)

(56) References Cited

U.S. PATENT DOCUMENTS

| | | | |
|---|---|---|---|
| 2006/0035639 A1 | 2/2006 | Etemad et al. | |
| 2006/0084443 A1* | 4/2006 | Yeo et al. | 455/449 |
| 2007/0049278 A1 | 3/2007 | Lindoff et al. | |
| 2007/0167165 A1* | 7/2007 | Yang | H04W 36/0055 455/439 |
| 2007/0264996 A1 | 11/2007 | Vikberg | |
| 2008/0188219 A1 | 8/2008 | Fischer | |
| 2008/0227447 A1* | 9/2008 | Jeong | H04W 48/10 455/434 |
| 2008/0268849 A1 | 10/2008 | Narasimha et al. | |
| 2009/0082020 A1* | 3/2009 | Ch'ng et al. | 455/435.3 |
| 2009/0086672 A1* | 4/2009 | Gholmieh | H04W 48/14 370/329 |
| 2009/0092056 A1* | 4/2009 | Kitazoe | H04W 36/0088 370/252 |
| 2009/0129341 A1 | 5/2009 | Balasubramanian et al. | |
| 2010/0234010 A1 | 9/2010 | Fischer | |
| 2010/0298017 A1* | 11/2010 | Dalsgaard et al. | 455/507 |

FOREIGN PATENT DOCUMENTS

| | | |
|---|---|---|
| EP | 1 718 093 A1 | 4/2005 |
| JP | 2006-311558 A | 11/2006 |
| WO | 9528813 A1 | 10/1995 |
| WO | 2005076648 A1 | 8/2005 |
| WO | 2007148911 A1 | 12/2007 |

OTHER PUBLICATIONS

Chinese Office Action dated Dec. 31, 2012, for CN Application No. 200880127738.7, 5 pages.
International Search Report dated Jan. 27, 2009, for corresponding International Application No. PCT/JP2008/003665, 3 pages.
Vodafone Group, "Handover to CSG cells," R2-072827, 3GPP TSG RAN WG2#58bis, Agenda Item: 08, Orlando, US, Jun. 25-29, 2007, 2 pages.
Vodafone Group, "Signalling on a CSG Cell," R2-072831, 3GPP TSG RAN WG2#58bis, Agenda Item: 08, Orlando, US, Jun. 25-29, 2007, 2 pages.
Nokia, Nokia Siemens Networks, "Access control for CSG cells," R2-072404, 3GPP TSG-RAN WG2#58bis, Agenda Item: 8, Orlando, USA, Jun. 25-29, 2007, 4 pages.
Panasonic, "CSG cell handover," R2-080884, 3GPP TSG RAN WG2#61, Agenda Item: 72, Sorrento, Italy, Feb. 11-15, 2008, 4 pages.
Panasonic, "UE access control in CSG cell," R2-082238, 3GPP TSG RAN WG2 #62, Agenda Item: 4.6.2, Kansas City, USA, May 5-9, 2008, 5 pages.
3GPP TS 36.300 V8.3.0, "3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 8)," Dec. 2007, 120 pages.
3GPP TS 36.331 V8.0.0, "3rd Generation Partnership Project; Technical Specification Group Radio Access Network; Evolved Universal Terrestrial Radio Access (E-UTRA) Radio Resource Control (RCC); Protocol specification (Release 8)," Dec. 2007, 56 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," R3-072429, 3GPP TSG-RAN WG3 Meeting #58, Jeju Island, South Korea, Nov. 5-9, 2007, 109 pages.
Extended European Search Report dated Apr. 23, 2014, for corresponding EP Patent Application No. 08871995.0-1857 / 2249602, 9 pages.
Nokia Corporation, Nokia Siemens Networks, "CSG Cell Identification for Mobility and Measurement Reporting," R2-074882, 3GPP TSG-RAN WG2 Meeting #59bis, Jeju, South Korea, Nov. 5-9, 2007, 2 pages.
Huawei, "Idle Mode Mobility for legacy UEs," R2-081659, Agenda Item: 6.4.9, 3GPP TSG RAN2 Meeting #61 bis, Shenzhen, China, Mar. 30-Apr. 4, 2008, 2 pages.
Japanese Office Action dated Aug. 19, 2014, for corresponding JP Application No. 2013-238922, 2 pages.

* cited by examiner

Fig.29A
EXAMPLE OF
ACCESS PROHIBITED CELL LIST

| CELL ID |
|---------|
| 2 |
| 34 |
| 140 |
| 236 |
| 370 |
| 410 |

Fig.29B
CSG CELL LIST

| CELL ID |
|---------|
| 300~350 |
| 450~500 |

BASE STATION, RADIO COMMUNICATION SYSTEM, AND HANDOVER METHOD

CROSS-REFERENCE(S) TO RELATED APPLICATION(S)

This application is based upon and claims the benefit of priority from Japanese Patent Application No. 2008-023207, filed on Feb. 1, 2008, and from Japanese Patent Application No. 2008-118558, filed on Apr. 30, 2008, the disclosures of which are incorporated herein in its entirety by reference.

BACKGROUND

1. Technical Field

The present invention relates to a handover technique, and particularly, to a technique for performing a handover by judging whether or not access by a terminal to a cell that is a handover destination is permitted or not.

2. Description of the Related Art

Techniques for performing a handover of a terminal engaged in communication between different cells have been conventionally known. For example, Section 10.1.2.1.1 of "3GPP TS 36.300 V8.3.0" prescribes a procedure of a handover between macro cells. FIG. 21 is a flow chart of a handover described in "3GPP TS 36.300 V8.3.0". Hereinafter, a conventional handover procedure will be described with reference to FIG. 21.

First, a terminal (UE: User Equipment) receives a signal from a neighboring base station and measures propagation path quality. The terminal notifies a measurement result to a currently-connected base station (Source eNB, hereinafter referred to as "SeNB") by means of a measurement report ("2. MEASUREMENT REPORTS" illustrated in FIG. 21). The measurement report includes a cell identifier (cell ID) of a base station having good propagation path quality as seen from the terminal, access information of the terminal (Tracking Area ID, hereinafter referred to as "TAID"), and the like. The SeNB determines a base station with a good propagation path status as a handover destination base station (Target eNB, hereinafter referred to as "TeNB") of the terminal.

The SeNB has a list of neighbor cells (Neighbor Cell List, hereinafter referred to as "NCL"). An NCL is a list of cell IDs of base stations neighboring the SeNB, access information (TAID), and the like. The SeNB uses the NCL to transmit a handover request signal ("4. HANDOVER REQUEST" illustrated in FIG. 21) to a base station (TeNB) corresponding to a cell ID notified by the measurement report.

Upon receiving the handover request signal, the TeNB determines whether or not a handover can be performed based on the status of remaining resources and the like. When the TeNB determines that a handover can be performed, the TeNB transmits a handover response signal ("6. HANDOVER REQUEST ACKNOWLEDGE" illustrated in FIG. 21) to the SeNB.

Upon receiving the handover response signal, the SeNB transmits a handover execution instruction signal ("7. HANDOVER COMMAND" illustrated in FIG. 21) to the terminal. The handover execution instruction includes information necessary for the terminal for subsequent uplink synchronization such as a terminal identification ID (C-RNTI) in the TeNB.

Upon receiving the handover execution instruction, the terminal transmits a Random Access Preamble to the handover destination base station (TeNB) and starts the uplink synchronization ("9. SYNCHRONIZATION" illustrated in FIG. 21). Upon receiving the Random Access Preamble, the TeNB performs an uplink allocation for the terminal and notifies allocation information to the terminal ("10. UL ALLOCATION+TA FOR UE" illustrated in FIG. 21). When connection with the TeNB is successful, the terminal transmits a handover confirmation signal ("11. HANDOVER CONFIRM" illustrated in FIG. 21) to the TeNB and notifies that handover processing by the terminal has been completed. This concludes a basic outline of handover processing between macro cells.

The 3GPP LTE project is evaluating installing an indoor base station (Home eNB) in a home to construct a CSG (Closed Subscriber Group) cell. A plurality of CSG cells are provided in a single macro cell. Unlike a base station of a macro cell, a base station of a CSG cell is subjected to access restriction as seen in a table in Section 6.3.1a.3 in "3GPP TS 36.311 V8.0.0". Therefore, a terminal is only able to connect to an access-permitted base station. Even if the terminal detects a base station with exceptional propagation path quality, the terminal is unable to connect to the base station without access permission.

BRIEF SUMMARY

Problems to be Solved by the Invention

In order to confirm whether or not access to a base station of a CSG cell is permitted, the terminal must confirm a TAID contained in a Scheduling Unit (hereinafter referred to as "SU-1") that is a system information transmitted from the base station. The terminal collates its own TAID and the TAID of the base station, and if the two TAIDs match, determines that access to the base station is permitted.

A signal transmitted from the base station of a CSG cell may sometimes be communicated over a different frequency from a signal transmitted from the base station of a macro cell. In this case, in order to receive an SU-1 transmitted from the base station and confirm whether or not access is permitted, the terminal must temporarily suspend communication with the base station of the macro cell. In the present specification, a period during which communication with the base station of the macro cell is temporarily suspended shall be referred to as a "gap period". Even during a gap period, the terminal is capable of detecting a radio wave from a cell being communicated over a different frequency band.

Since a CSG cell has the characteristics described above, the terminal must conceivably receive an SU-1 transmitted from the handover destination during the gap period and determine whether or not access to the CSG cell that is the handover destination is permitted.

FIG. 22 is a diagram illustrating, based on specifications currently being formulated, operations during a handover from a base station of a macro cell to a base station of a CSG cell. Note that the flow depicted in FIG. 22 is a virtual flow that attempts to describe improvements in the flow currently being formulated in an easily comprehensible manner, and is not heretofore known. In FIG. 22, UE denotes a terminal, SeNB denotes a base station of a macro cell that is a handover source, and TeNB denotes a base station of a CSG cell that is a handover destination. The TeNB periodically transmits an SU-1 to the terminal. Due to time sharing that switches between a period where a signal transmitted from the SeNB is received and a period where a signal transmitted from the TeNB is received (gap period), the terminal receives signals from both base stations having different frequencies.

The terminal detects radio waves of the SeNB and the TeNB, and transmits a report on the reception qualities of the radio waves to the SeNB that is in communication with the terminal. The SeNB judges whether a handover should be performed or not based on the reception qualities of the SeNB and the TeNB. For example, the SeNB compares the reception qualities of the SeNB and the TeNB and judges that a handover to the TeNB should be performed when the reception quality of the TeNB is better than the reception quality of the SeNB. When a handover should be performed, a handover request is transmitted to the TeNB. Having received the handover request, the TeNB judges a handover enabled/disabled state based on whether there are resources for connecting a new terminal and the like, and transmits a handover response to the SeNB. In this case, let us assume that the TeNB sends a handover OK response.

Next, based on the report from the terminal, the SeNB determines whether access from the terminal to the TeNB is permitted or not. More specifically, upon receiving the SU-1, the terminal detects a TAID in the SU-1, compares the terminal TAID with the SeNB TAID, and judges whether access is possible or not. The terminal includes access permission information in the measurement report and transmits the same to the SeNB. When access from the terminal to the base station is permitted, the SeNB transmits a handover command to the terminal. Upon receiving the handover command, the terminal transmits a RACH preamble to the SeNB and performs an operation to connect to the TeNB. The following operations have been omitted from FIG. 22.

As illustrated in FIG. 22, in order to judge whether or not access to an SeNB that is the handover destination is permitted, the terminal must receive an SU-1 transmitted from the SeNB. Unless an SU-1 is transmitted during a gap period, there will be no more opportunities to receive an SU-1 until the next gap period. In addition, there is no guarantee that an SU-1 will be transmitted at a timing that coincides with the next gap period. For example, according to the specifications currently being formulated, a gap period exists every several 10 ms and only has a length of 6 ms. Unless an SU-1 is transmitted during a 6-ms gap period, there will be no more opportunities to receive an SU-1 until the next gap period. In addition, there is no guarantee that an SU-1 will be transmitted at a timing that coincides with the next gap period. Therefore, a judgment of whether or not access is permitted may take time and may result in a time-consuming handover operation.

Accordingly, in consideration of the background described above, it is an object of the present invention to provide a base station and a radio communication system capable of promptly judging whether access is permitted or not and realizing a handover in a smooth manner.

Means for Solving the Problems

A radio communication system according to the present invention comprises a first base station that controls communication with a terminal in a first cell and a second base station that controls communication with a terminal in a second cell contained in the first cell, wherein: the first base station transmits a handover request for performing a handover of the terminal from the first cell to the second cell to the second base station; the second base station transmits a handover response that is a response to the handover request and which includes an identifier of the terminal in the second cell to the base station of the first cell; the first base station notifies the identifier contained in the handover response to the terminal; and the second base station repeatedly transmits a dedicated signal containing a handover command via a dedicated channel set using the identifier at an interval shorter than a period during which the terminal is able to receive data from the base station of the second cell.

A radio communication system according to another aspect of the present invention comprises a first base station that controls communication with a terminal in a first cell and a second base station that controls communication with a terminal in a second cell contained in the first cell, wherein: the first base station transmits a handover request for performing a handover of the terminal from the first cell to the second cell to the second base station; the second base station transmits a handover response that is a response to the handover request to the base station of the first cell; and the second base station shortens a transmission interval of a system information containing access information to be transmitted through a common channel in comparison to before receiving the handover request when performing a handover in response to the handover request.

As will be described below, the present invention also includes other aspects. As such, the disclosure of the present invention is intended to provide a part of the present invention and is not intended to limit the scope of the present invention as described and claimed herein.

BRIEF DESCRIPTION OF THE SEVERAL VIEWS OF THE DRAWINGS

FIG. 29A is a diagram illustrating an example of an access-prohibited cell list;

FIG. 29B is a diagram illustrating a CSG cell list;

DETAILED DESCRIPTION

Figure 1:
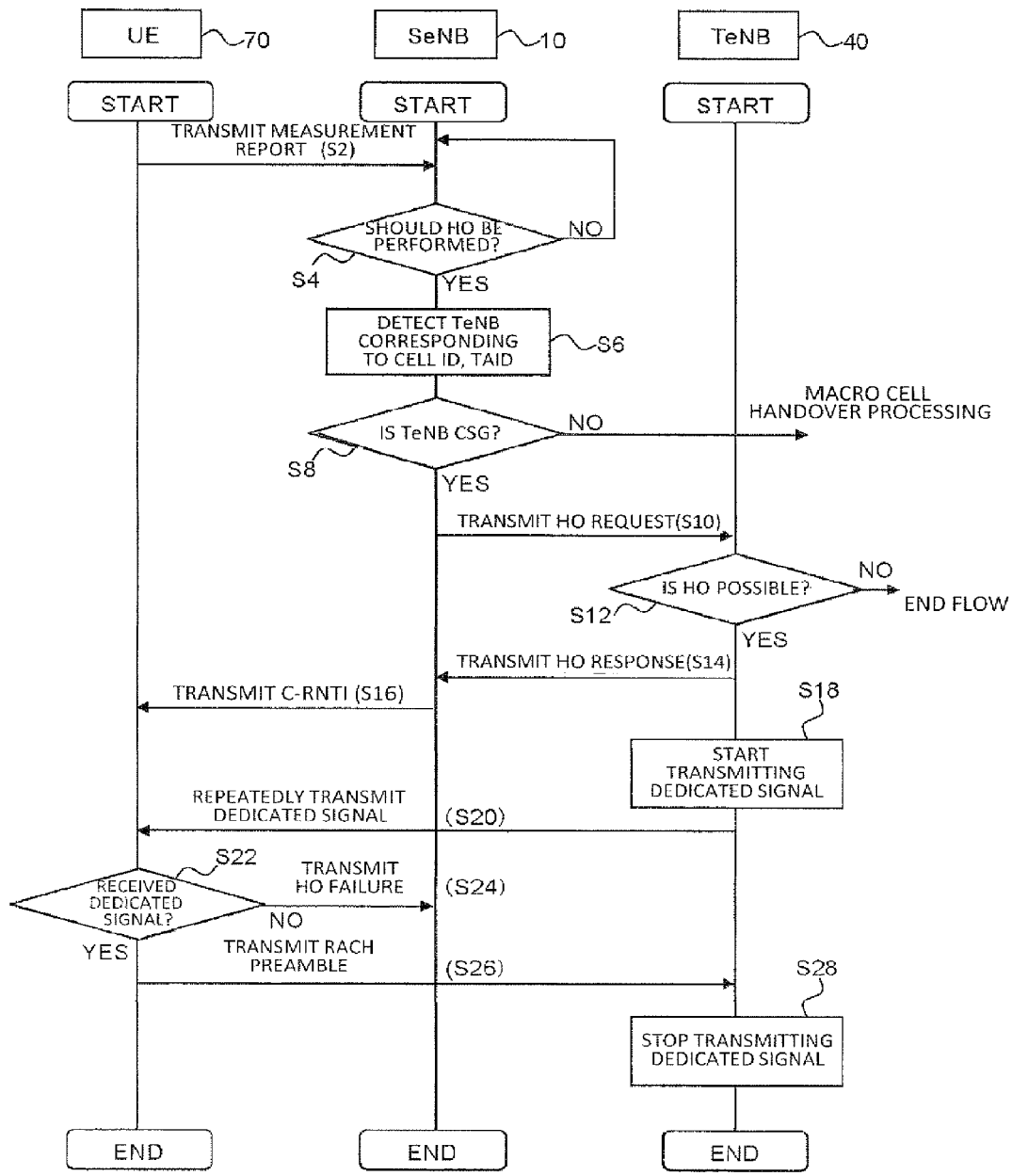
FIG. 1 is a diagram illustrating operations during a handover by a radio communication system according to a first embodiment.

Hereinafter, a detailed description of the present invention will be given. It is to be understood that the embodiments of the present invention described hereinafter are illustrative only and various modifications can be made thereon. As such, the specific configurations and functions disclosed below are not intended to limit the scope of the present invention.

A base station according to an embodiment controls, in a network including a first cell and a second cell contained in the first cell, communication with a terminal in the second cell, the base station comprising: a handover request receiver that receives a handover request for performing a handover of the terminal from the first cell to the second cell from a base station of the first cell; a handover response transmitter that transmits a handover response that is a response to the handover request and which includes an identifier of the terminal in the second cell to the base station of the first cell, and causes the base station of the first cell to notify the identifier to the terminal; and a dedicated signal transmitter that repeatedly transmits a dedicated signal containing a handover command to the terminal via a dedicated channel set using the identifier at an interval shorter than a period during which the terminal is able to receive data from the base station of the second cell.

As described above, the base station of the second cell transmits a handover response including an identifier in response to a handover request to the base station of the first cell, and causes the base station of the first cell to notify the identifier to the terminal. Accordingly, a dedicated signal can be transmitted to the terminal using a dedicated channel by merely performing a process of returning a handover response to the base station of the first cell. In addition, since a transmission interval of the dedicated signal is set shorter than a period during which the terminal is able to receive data from the base station of the second cell, the terminal is able to receive the dedicated signal during a first receivable period after the start of transmission of the dedicated signal and a handover can be performed in a short period of time.

The base station may further comprise a RACH preamble command receiver that receives a RACH preamble command transmitted from the terminal in accordance with the dedicated signal, wherein the dedicated signal transmitter may stop transmission of the dedicated signal when the RACH preamble command is received or when a predetermined period of time has lapsed from the start of transmission of the dedicated signal.

By stopping transmission of the dedicated signal when a predetermined period of time has lapsed as described above, in the event that a handover of the terminal to the second cell is not performed, the base station of the second cell can release resources of the dedicated channel at an appropriate timing.

A base station according to another embodiment controls, in a network including a first cell and a second cell contained in the first cell, communication with a terminal in the second cell, the base station comprising: a handover request receiver that receives a handover request for performing a handover of the terminal from the first cell to the second cell from a base station of the first cell; a handover response transmitter that transmits a response to the handover request to the base station of the first cell; and a system information transmitter that transmits a system information containing access information through a common channel, wherein the system information transmitter shortens a transmission interval of the system information as compared to before receiving the handover request when performing a handover in accordance with the handover request.

As described above, the base station of the second cell shortens a transmission interval of a system information as compared to before receiving a handover request when performing a handover in accordance with the handover request. Accordingly, the probability of the terminal failing to receive the system information can be lowered and a handover can be performed in a short period of time. Moreover, by setting the transmission interval of the system information shorter than a period during which data is receivable from the base station of the second cell, the system information can be received during a first receivable period.

The base station may further comprise a RACH preamble command receiver that receives a RACH preamble command transmitted from the terminal in accordance with the dedicated signal, wherein the system information transmitter may restore the transmission interval of the system information to an original transmission interval when the RACH preamble command is received or when a predetermined period of time has lapsed after shortening the transmission interval of the system information.

By stopping transmission of the dedicated signal when a predetermined period of time has lapsed as described above, the base station of the second cell can restore resources of the common channel to an original usage state.

A base station according to another embodiment controls, in a network including a first cell and a second cell contained in the first cell, communication with a terminal in the first cell, the base station comprising: a measurement report receiver that receives, from the terminal, a measurement report including a cell identifier of the second cell whose radio wave has been detected by the terminal and quality information of the radio wave; a handover request transmitter that transmits a handover request to a base station to which access from the terminal is permitted among base stations of the second cell having a cell identifier judged to be a handover destination when it is judged, based on the measurement report, that a handover of the terminal from the first cell to the second cell should be performed; a handover response receiver that receives a handover response that is a response to the handover request and which includes an identifier of the terminal in the second cell from the second cell; and an identifier transmitter that notifies the identifier contained in the handover response to the terminal.

By notifying the identifier included in a response to a handover request to the terminal, a dedicated signal can be transmitted using a dedicated channel from the base station of the second cell to the terminal.

A base station according to another embodiment controls, in a network including a first cell and a second cell contained in the first cell, communication with a terminal in the first cell, the base station comprising: a measurement report receiver that receives, from the terminal, a measurement report including a cell identifier of the second cell whose radio wave has been detected by the terminal and quality information of the radio wave; a handover request transmitter that transmits a handover request to a base station of the second cell having a cell identifier judged to be a handover destination when it is judged, based on the measurement report, that a handover of the terminal from the first cell to the second cell should be performed; a handover response receiver that receives a handover response to the handover request from the second cell; an access permission state notification receiver that receives information on an access permission state of the second cell from the terminal; and a handover command transmitter that transmits a handover command to the terminal when access to the base station of the second cell is permitted.

As described above, the base station of the first cell transmits a handover request to all base stations having a cell identifier judged to be a handover destination regardless of whether access from the terminal is permitted or not. Accordingly, the base station of the second cell can transmit information regarding access permission to the terminal. For example, by having the base station of the second cell transmit a system information containing access information at an interval that is shorter than an ordinary system information transmission interval, the terminal can promptly comprehend whether access to the base station of the second cell is permitted or not.

In the base station described above, the handover request transmitter may transmit the handover request to a base station to which access from the terminal is permitted among base stations of the second cell having a cell identifier to which it is judged that a handover should be performed based on the measurement report.

As described above, the base station of the first cell transmits a handover request to a base station accessible by the terminal among base stations of the second cell having a cell identifier judged to be a handover destination. Accordingly, since resources for transmitting a handover request can be saved and the number of base stations of the second cell receiving the handover request can be reduced, the processing load on base stations of the second cell can be alleviated.

A base station according to another embodiment comprises: a receiver that receives a measurement report from a terminal; a judging unit that judges whether a handover of the terminal should be performed or not based on the received measurement report; and a transmitter that transmits, when it is judged that a handover of the terminal should be performed, an instruction for changing a transmission frequency of a system information to a base station device that is a handover destination.

As described above, by shortening the transmission interval of a system information to be transmitted by the base station of the handover destination as compared to before the judgment to perform a handover is made, the probability of the terminal failing to receive the system information can be lowered and a handover can be performed in a short period of time. Moreover, by setting the transmission interval of the system information shorter than a period during which data is receivable from the base station of the second cell, the system information can be received during a first receivable period.

The base station according to the present invention may further comprise a handover command transmitter that transmits a handover command including a reception instruction of a system information to be transmitted from a base station that is a handover destination to the terminal when a handover-permitted response is received from the base station that is the handover destination.

Accordingly, the terminal may switch to processing for receiving a system information to be transmitted from the base station of the handover destination so as to reliably receive the system information.

A radio communication system according to the present invention comprises a first base station that controls communication with a terminal in a first cell and a second base station that controls communication with a terminal in a second cell contained in the first cell, wherein: the first base station transmits a handover request for performing a handover of the terminal from the first cell to the second cell to the second base station; the second base station transmits a handover response that is a response to the handover request and which includes an identifier of the terminal in the second cell to the base station of the first cell; the first base station notifies the identifier contained in the handover response to the terminal; and the second base station repeatedly transmits a dedicated signal containing a handover command to the terminal via a dedicated channel set using the identifier at an interval shorter than a period during which the terminal is able to receive data from the base station of the second cell.

As described above, since the first base station notifies an identifier of the terminal in the second cell to the terminal, the second base station can transmit a dedicated signal to the terminal using a dedicated channel by merely performing a process of returning a handover response to the base station of the first cell. In addition, since a transmission interval of a dedicated signal including a handover command is set shorter than a period during which data can be received from the base station of the second cell, the terminal is able to receive the dedicated signal during a first receivable period after the start of transmission of the dedicated signal and a handover can be performed in a short period of time.

A radio communication system according to another embodiment comprises a first base station that controls communication with a terminal in a first cell and a second base station that controls communication with a terminal in a second cell contained in the first cell, wherein: the first base station transmits a handover request for performing a handover of the terminal from the first cell to the second cell to the second base station; the second base station transmits a handover response that is a response to the handover request to the base station of the first cell; and the second base station shortens a transmission interval of a system information containing access information to be transmitted through a common channel in comparison to before receiving the handover request when performing a handover in response to the handover request.

As described above, when the second base station receives a handover request, by shortening the transmission interval of a system information to be transmitted as compared to before receiving the handover request, the probability of the terminal failing to receive the system information can be lowered and a handover can be performed in a short period of time. Moreover, by setting the transmission interval of the system information shorter than a period during which data is receivable from the base station of the second cell, the system information can be received during a first receivable period.

A handover method according to the present invention is to be performed by a base station that controls, in a network including a first cell and a second cell contained in the first cell, communication with a terminal in the second cell, the handover method comprising the steps of: receiving a handover request for performing a handover of the terminal from the first cell to the second cell from a base station of the first cell; transmitting a handover response that is a response to the handover request and which includes an identifier of the terminal in the second cell to the base station of the first cell, and causing the base station of the first cell to notify the identifier to the terminal; and repeatedly transmitting a dedicated signal containing a handover command to the terminal via a dedicated channel set using the identifier at an interval shorter than a period during which the terminal is able to receive data from the base station of the second cell.

As described above, the base station of the second cell transmits a handover response including an identifier in response to a handover request and causes the base station of the first cell to notify the identifier to the terminal. Accordingly, the base station of the second cell can transmit a dedicated signal to the terminal using a dedicated channel by merely performing a process of returning a handover response to the base station of the first cell. In addition, since a transmission interval of the dedicated signal is set shorter than a period during which the terminal is able to receive data from the base station of the second cell, the terminal is able to receive the dedicated signal during a first receivable period after the start of transmission of the dedicated signal and a handover can be performed in a short period of time.

A handover method according to another embodiment is to be performed by a base station that controls, in a network including a first cell and a second cell contained in the first cell, communication with a terminal in the second cell, the handover method comprising the steps of: receiving a handover request for performing a handover of the terminal from the first cell to the second cell from a base station of the first cell; transmitting a response to the handover request to the base station of the first cell; and shortening a transmission interval of a system information containing access information to be transmitted through a common channel in comparison to before receiving the handover request when performing a handover in response to the handover request.

As described above, by shortening the transmission interval of a system information as compared to before receiving the handover request when a handover request is received, the probability of the terminal failing to receive the system information can be lowered and a handover can be performed in a short period of time. Moreover, by setting the transmission interval of the system information shorter than a period during which data is receivable from the base station of the second cell, the system information can be received during a first receivable period.

Hereinafter, a radio communication system and a base station according to embodiments of the present invention will be described with reference to the drawings.

First Embodiment

FIG. 1 is a flow chart illustrating operations of a handover performed by a radio communication system according to a first embodiment. Configurations of the radio communication system and a base station will now be described before presenting a description of a handover operation.

Figure 2:
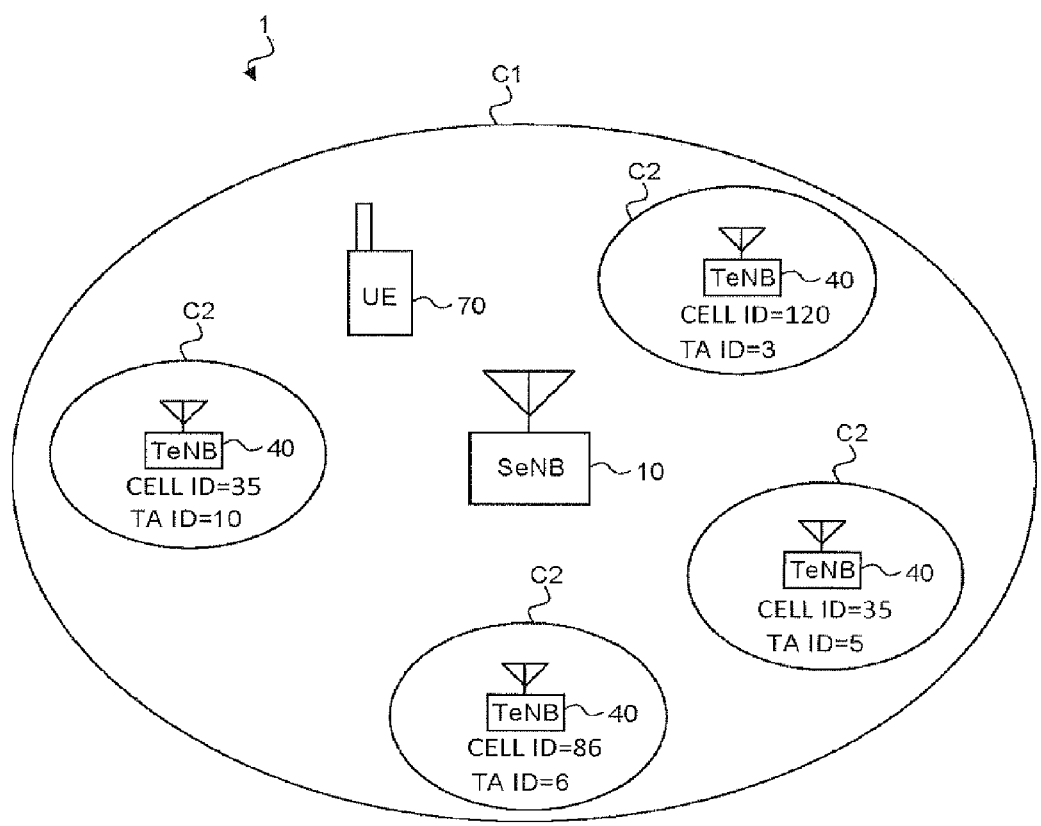
FIG. 2 is a diagram illustrating an overall configuration of a radio communication system according to the first embodiment.

FIG. 2 is a diagram illustrating an overall configuration of a radio communication system 1. The radio communication system 1 comprises a base station 10 of a macro cell C1, base stations 40 of a plurality of CSG cells C2 contained in the macro cell C1, and a terminal 70. Since a handover from a base station of the macro cell C1 to a base station of the CSG cell C2 will be described in the present embodiment, a base station 10 of the macro cell C1 shall be denoted as "SeNB 10" and base stations 40 of the CSG cell C2 as "TeNB 40". Note that the macro cell C1 corresponds to the "first cell" and the CSG cell C2 to the "second cell" as respectively set forth in the claims.

The CSG cell C2 is given a cell ID. Although a cell ID is an identifier of the cell, there may be cases where cells having the same ID exist in the macro cell C1. The CSG cell C2 has a TAID as access information. The base station of the CSG cell C2 permits access from a terminal 70 having the same TAID.

Figure 3:
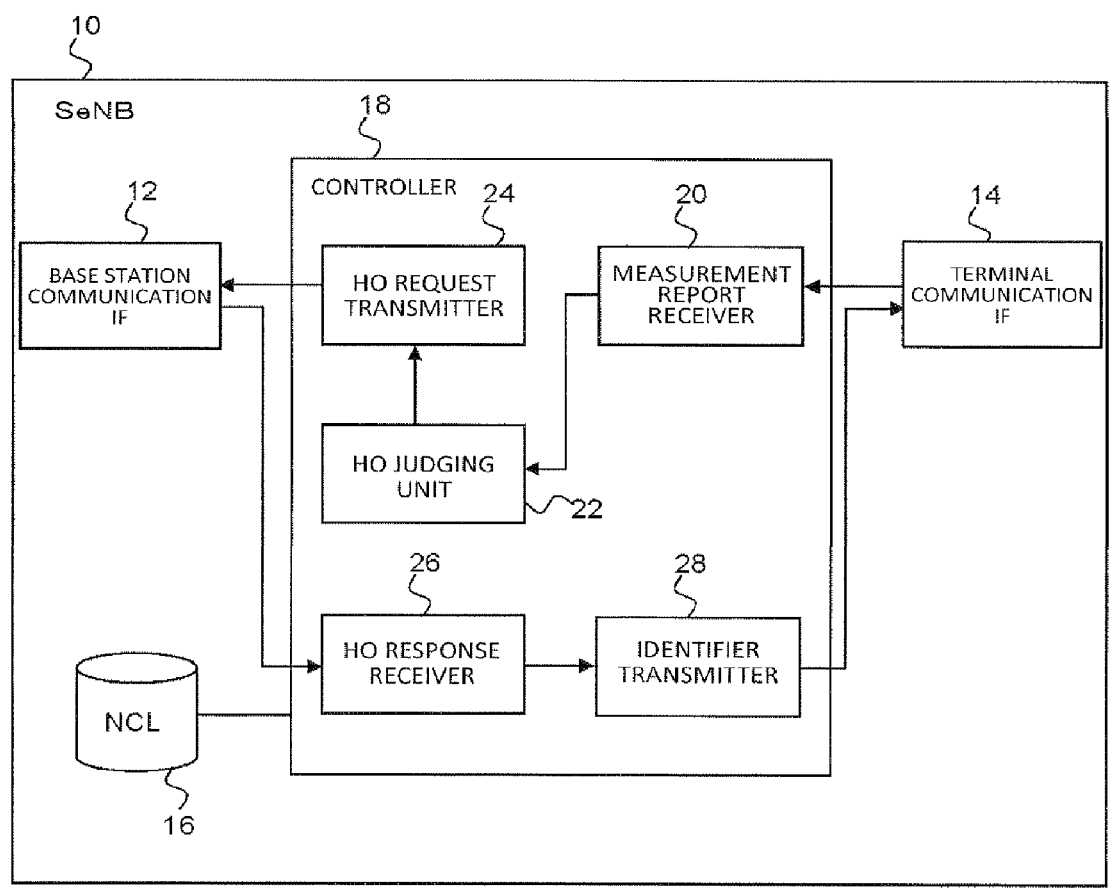
FIG. 3 is a diagram illustrating a configuration of an SeNB according to the first embodiment.

FIG. 3 is a diagram illustrating a configuration of the base station (SeNB) 10 that is a handover source. The SeNB 10 comprises a base station communication interface (eNB Communication IF) 12 that is a communication interface with the TeNB 40 of the CSG cell C2, a terminal communication interface (UE Communication IF) 14 that is a communication interface with the terminal 70, an NCL 16 storing information on neighbor cells, and a controller 18 that controls communication with the TeNB 40 and the terminal 70. The NCL 16 contains cell IDs, access information (TAID), and the like of base stations neighboring the SeNB.

The controller 18 comprises a measurement report receiver 20, a handover judging unit 22, a handover request transmitter 24, a handover response receiver 26, and an identifier transmitter 28. Moreover, while FIG. 3 illustrates a configuration necessary for performing a handover, the SeNB 10 has configurations necessary for communication control and the like in addition to the configuration described above.

The measurement report receiver 20 receives a measurement report transmitted from the terminal 70. The measurement report contains a cell ID of a base station whose radio wave is detected by the terminal 70 and information on the reception quality of the radio wave. The handover judging unit 22 judges whether or not a handover should be performed based on the measurement report. For example, the handover judging unit 22 compares the reception qualities of the SeNB 10 and the TeNB 40, and judges that a handover to the TeNB 40 should be performed when the reception quality of the TeNB 40 is better than that of the SeNB 10. When the HO judging unit 22 judges that a handover should be performed, the handover request transmitter 24 transmits a handover request (HO request) to the base station of the handover destination. The handover request transmitter 24 determines a cell ID and a TAID of the CSG cell C2 using data in the NCL 16. Subsequently, the handover request transmitter 24 transmits a handover request to CSG cells C2 having the same TAID as the TAID of the terminal 70 that is the transmission source of the measurement report among the CSG cells C2 having the cell ID notified in the measurement report from the terminal 70. The handover response receiver 26 receives a handover response (HO response) transmitted from the TeNB 40 in response to the handover request. The identifier transmitter 28 transmits an identifier contained in the handover response to the terminal 70.

Figure 4:
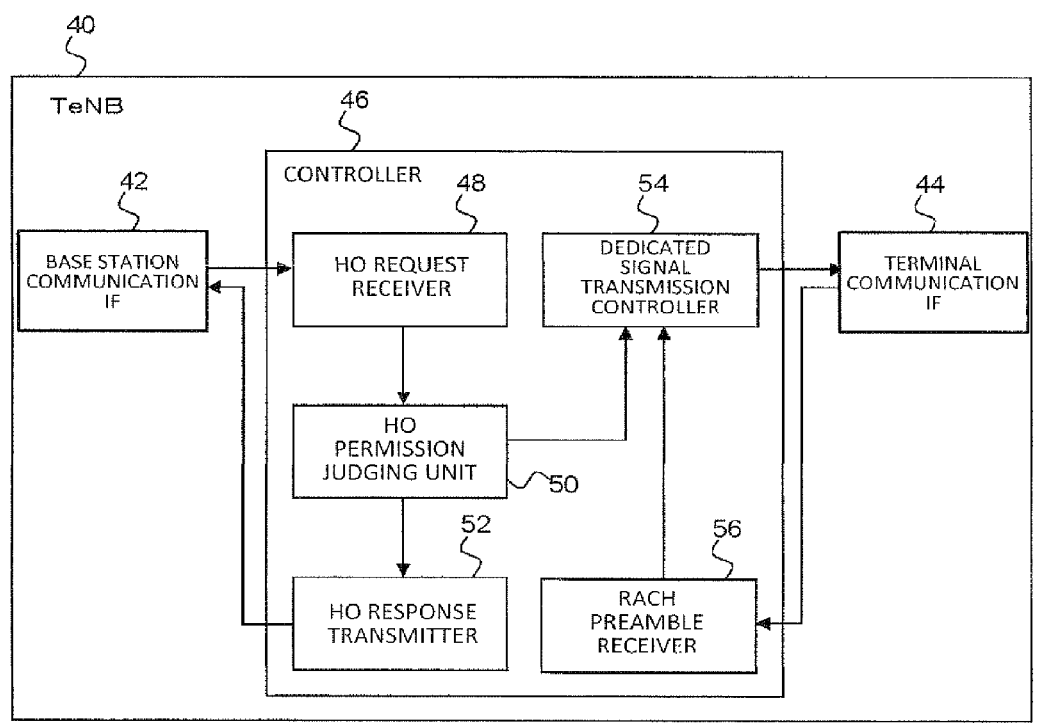
FIG. 4 is a diagram illustrating a configuration of a TeNB according to the first embodiment.

FIG. 4 is a diagram illustrating a configuration of the base station (TeNB) 40 that is the handover destination. The TeNB 40 comprises a base station communication interface (eNB Communication IF) 42 that is a communication interface with the SeNB 10 of the macro cell C1, a terminal communication interface (UE Communication IF) 44 that is a communication interface with the terminal 70, and a controller 46 that controls communication with the SeNB 10 and the terminal 70.

The controller 46 comprises a handover request receiver 48, a handover enabled/disabled state judging unit 50, a handover response transmitter 52, a dedicated signal transmitter 54, and a RACH preamble receiver 56. Moreover, while FIG. 4 illustrates a configuration necessary for performing a handover, the TeNB 40 has configurations necessary for communication control and the like in addition to the configuration described above.

The handover request receiver 48 receives a handover request transmitted from the SeNB 10. The handover enabled/disabled state judging unit 50 judges whether a handover is enabled or disabled based on whether there are new resources that can be allocated to the terminal 70, and the like. The handover response transmitter 52 transmits a handover response in response to the handover request. In this case, the handover response contains an identifier to be used by the TeNB 40 to identify the terminal 70 in the second cell. When it is judged that a handover can be performed, the dedicated signal transmitter 54 transmits a dedicated signal containing a handover command to the terminal 70 using a dedicated channel. The RACH preamble receiver 56 receives a RACH preamble transmitted from the terminal 70.

Next, operations of the radio communication system according to the first embodiment will be described with reference to FIG. 1. FIG. 1 illustrates operations during a handover of the terminal 70, in communication with the SeNB 10, to the TeNB 40. The terminal 70 periodically transmits a measurement report to the SeNB 10 (S2). The SeNB 10 compares the reception quality of a radio wave from the SeNB 10 with the reception quality of a radio wave from the TeNB 40 to judge whether or not a handover should be performed (S4). For example, when the reception quality of a radio wave from the TeNB 40 is better than the reception quality of a radio wave from the SeNB 10 by a predetermined threshold or more, the SeNB 10 judges that a handover should be performed. When the reception quality of the radio wave from the SeNB 10 is better than that of the TeNB 40, the SeNB 10 judges that a handover should not be performed. When it is judged that a handover should not be performed (NO in S4), the SeNB 10 awaits the reception of a next measurement report.

When it is judged that a handover should be performed (YES in S4), the SeNB 10 extracts TeNBs 40 having an identifier corresponding to the cell ID notified in the measurement report from the NCL 16. Subsequently, the SeNB 10 determines a TeNB 40 having the same TAID as the TAID of the terminal 70 among the extracted TeNBs 40 of the CSG cell C2 (S6), and judges whether or not the TeNB is a base station of a CSG cell (S8). When the TeNB is a CSG cell (YES in S8), a handover request is transmitted to the determined TeNB 40 (S10). When the TeNB is not a CSG cell (NO in S8), a handover of the macro cell is performed.

The TeNB 40 having received the handover request judges whether a handover can be performed or not (S12). When a handover can be performed (YES in S12), the TeNB 40 transmits a handover response to the SeNB 10 (S14). Note that FIG. 1 depicts a case where a handover can be performed. When a handover cannot be performed (NO in S12), the radio communication system 1 does not perform operations of step S14 and thereafter and terminates the flow. When a handover can be performed, an identifier of the terminal 70 with respect to the TeNB 40 is to be included in the handover response. In the present embodiment, a C-RNTI is used as the identifier.

Upon receiving the handover response from the TeNB 40 (S14), the SeNB 10 transmits the C-RNTI contained in the handover response to the terminal 70 (S16). By receiving the C-RNTI transmitted from the SeNB 10, the terminal 70 can now receive the dedicated signal addressed to the terminal 70 to be transmitted from the TeNB 40 via a dedicated channel.

When it is judged in S12 that a handover can be performed, the TeNB 40 starts transmission of the dedicated signal to the terminal 70 via the dedicated channel (S18). In this case, the dedicated signal includes access information and information contained in a handover command such as information necessary for uplink synchronization. The TeNB 40 repeatedly transmits the dedicated signal until the terminal 70 receives the dedicated signal and a RACH preamble is transmitted to the TeNB 40 (S20). The interval of repetitive transmission of the dedicated signal from the TeNB 40 to the terminal 70 is to be set shorter than a gap period of the terminal 70.

The terminal 70 judges whether the dedicated signal has been received or not (S22). The terminal 70 can receive the dedicated signal if the dedicated signal is transmitted during the gap period of the terminal 70. Upon receiving the dedicated signal (YES in S22), the terminal 70 confirms whether access to the TeNB 40 has been permitted or not. In the present embodiment, in step S6, since the SeNB 10 only transmits a handover request to a TeNB 40 that can be accessed from the terminal 70, the terminal 70 has been permitted access to the TeNB 40 transmitting the dedicated signal. Therefore, a reception of the dedicated signal signifies that access to the TeNB 40 that is the transmission source of the dedicated signal has been permitted. If unable to receive the dedicated signal over a certain period of time (NO in S22), a judgment of handover failure is made and transmitted to the SeNB (S24). In this case, "a certain period of time" signifies a period of time corresponding to an interval between gap periods.

Upon receiving the dedicated signal, the terminal 70 starts processing for a handover based on the handover command contained in the dedicated signal. Specifically, the terminal 70 transmits a RACH preamble for starting uplink synchronization to the TeNB 40 (S26), and starts processing to connect to the TeNB 40. Upon receiving the RACH preamble, the TeNB 40 stops transmission of the dedicated signal (S28).

When the terminal 70 does not receive the dedicated signal over a certain period of time, the terminal 70 is conceivably approaching a CSG cell C2 to which access is not permitted. In this case, "a certain period of time" signifies a period of time corresponding to an interval between gap periods. When a certain period of time lapses from the start of transmission of the dedicated signal, the TeNB 40 stops transmission of the dedicated signal. This concludes the description of the radio communication system 1 and the base stations 10 and 40 according to the first embodiment.

The TeNB 40 according to the first embodiment adopts a configuration that transmits a handover response containing a C-RNTI and causes the SeNB 10 to notify the C-RNTI to the terminal 70. Accordingly, a dedicated channel of the TeNB 40 can be allocated to the terminal 70 before receiving a handover command instruction and a handover process can be performed in a smooth manner.

Figure 5:
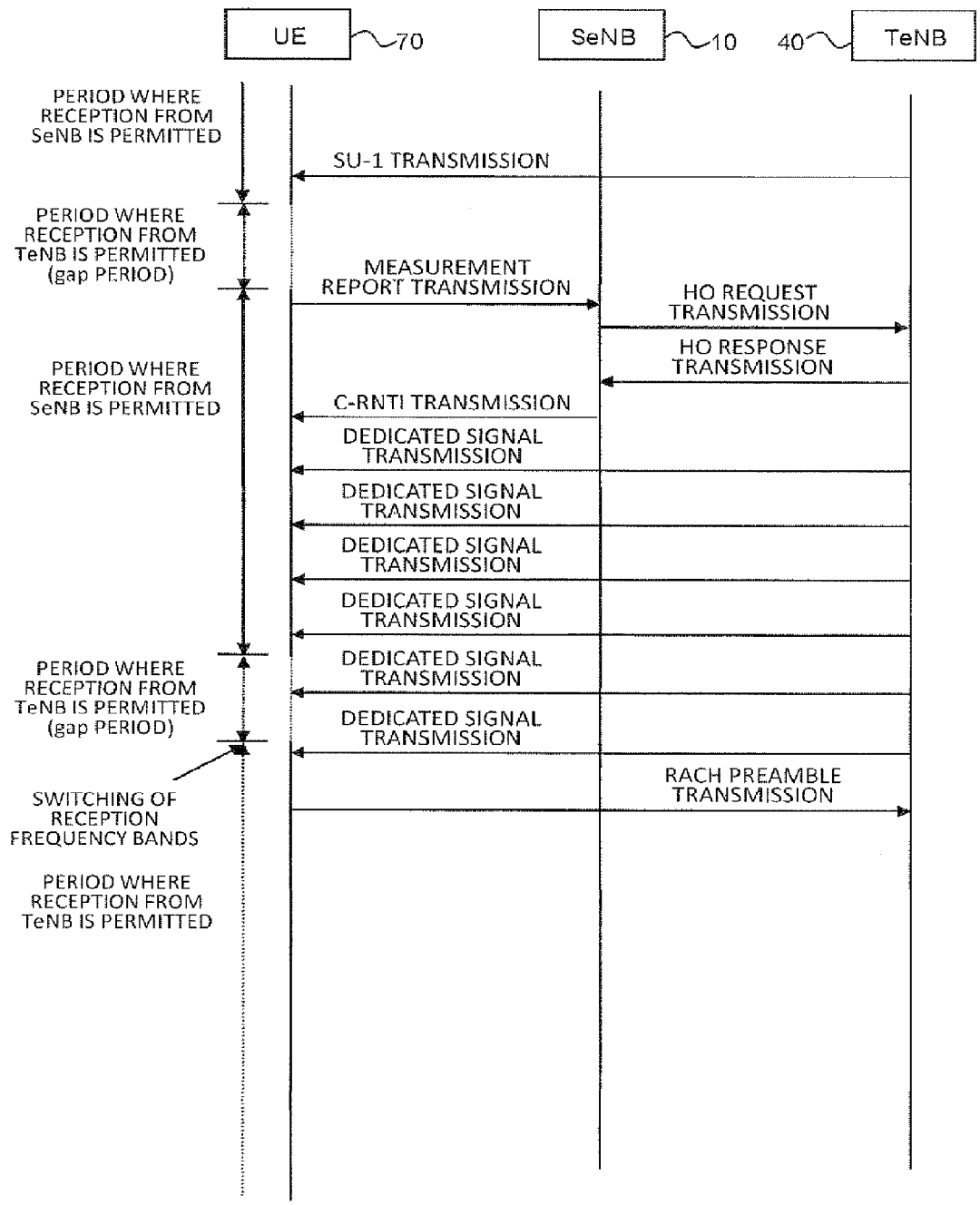
FIG. 5 is a diagram illustrating an example of a flow of signals transmitted and received during a handover according to the first embodiment.

Next, an advantageous effect gained by transmitting the dedicated signal at a transmission interval that is shorter than the gap period will be described. FIG. 5 is a diagram illustrating an example of a flow of signals transmitted and received during a handover by the radio communication system 1 according to the first embodiment. As illustrated in FIG. 5, since the TeNB 40 according to the first embodiment repeatedly transmits the dedicated signal at a shorter interval than the gap period, at least one transmission of the individual will occur within a gap period. Therefore, the terminal 70 is able to reliably receive the dedicated signal during the first gap period and a handover can be performed in a short period of time.

Second Embodiment

Next, a radio communication system according to a second embodiment will be described. In the same manner as the first embodiment, a radio communication system according to the second embodiment comprises a base station (SeNB) 10 of a macro cell C1, base stations (TeNBs) 40 of a plurality of CSG cells C2 contained in the macro cell C1, and a terminal 70.

Figure 6:
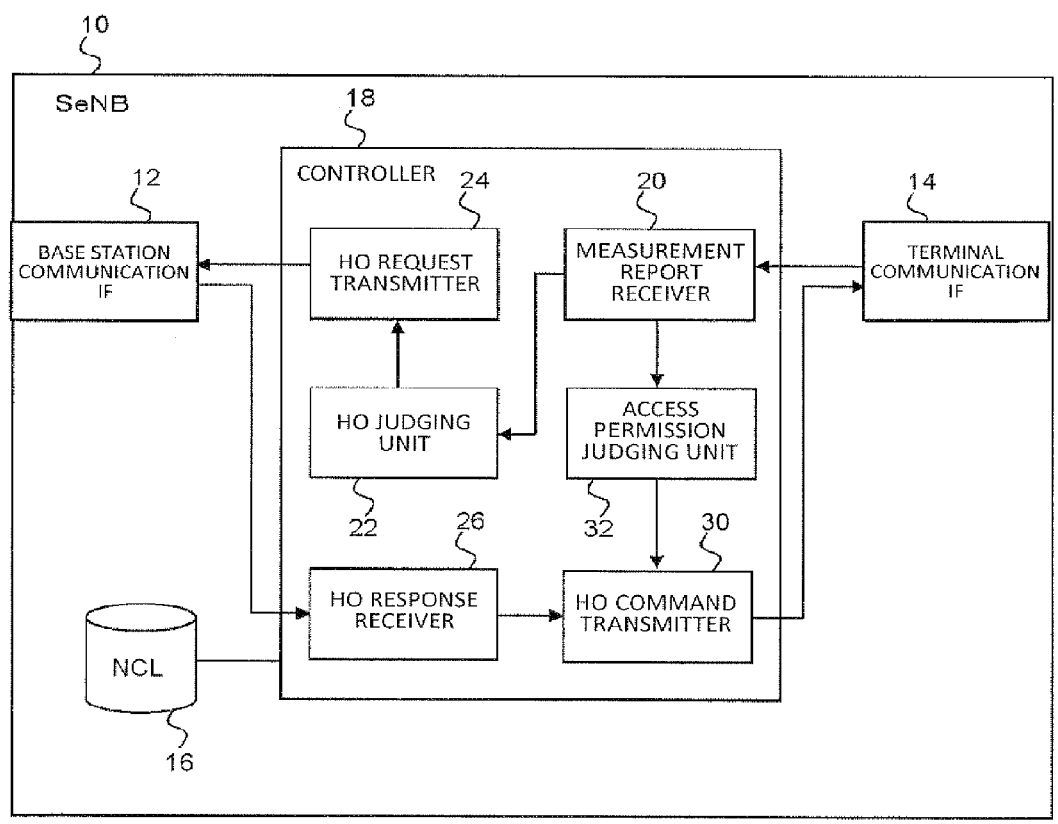
FIG. 6 is a diagram illustrating a configuration of an SeNB according to a second embodiment.

FIG. 6 is a diagram illustrating a configuration of the base station (SeNB) 10 that is a handover source. The SeNB 10 comprises a base station communication interface 12 that is a communication interface with the TeNB 40 of the CSG cell C2, a terminal communication interface 14 that is a communication interface with the terminal 70, an NCL 16 storing information on neighbor cells, and a controller 18 that controls communication with the TeNB 40 and the terminal 70. Moreover, while FIG. 6 illustrates a configuration necessary for performing a handover, the SeNB 10 has configurations necessary for communication control and the like in addition to the configuration described above.

The controller 18 comprises a measurement report receiver 20, a handover judging unit 22, a handover request transmitter 24, a handover response receiver 26, an access permission judging unit 32, and a handover command transmitter 30.

The measurement report receiver 20 receives a measurement report transmitted from the terminal 70. The measurement report contains a cell ID of a TeNB 40 whose radio wave is detected by the terminal 70 and information on the reception quality of the radio wave. The handover judging unit 22 judges whether or not a handover should be performed based on the measurement report.

When the handover judging unit 22 judges that a handover should be performed, the handover request transmitter 24 transmits a handover request to the TeNB 40 of the handover destination. The handover request transmitter 24 determines a cell ID of a CSG cell using data in the NCL 16. The handover request transmitter 24 transmits the handover request to the TeNB 40 of the CSG cell C2 having the cell ID notified in the measurement report from the terminal 70.

The handover response receiver 26 receives a handover response transmitted from the TeNB 40 in response to the handover request. Based on access information contained in the measurement report transmitted from the terminal 70, the access permission judging unit 32 judges whether or not access from the terminal 70 to the TeNB 40 that is the handover destination is permitted. The handover command transmitter 30 transmits a handover command to the terminal 70.

Figure 7:
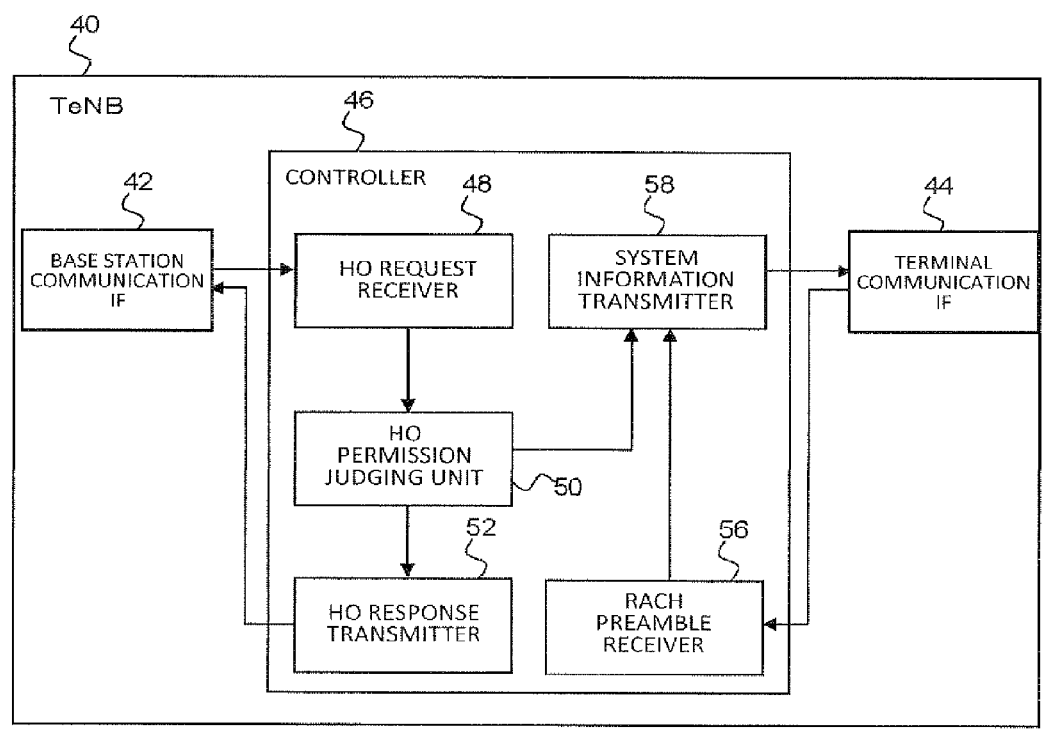
FIG. 7 is a diagram illustrating a configuration of a TeNB according to the second embodiment.

FIG. 7 is a diagram illustrating a configuration of the base station (TeNB) 40 that is the handover destination. The TeNB 40 comprises a base station communication interface 42 that is a communication interface with the SeNB 10, a terminal communication interface 44 that is a communication interface with the terminal 70, and a controller 46 that controls communication with the SeNB 10 and the terminal 70.

The controller 46 comprises a handover request receiver 48, a handover enabled/disabled state judging unit 50, a handover response transmitter 52, a system information transmitter 58, and a RACH preamble receiver 56. Moreover, while FIG. 7 illustrates a configuration necessary for performing a handover, the TeNB 40 has configurations necessary for communication control and the like in addition to the configuration described above.

The handover request receiver 48 receives a handover request transmitted from the SeNB 10. The handover enabled/disabled state judging unit 50 judges whether a handover is enabled or disabled based on whether there are new resources that can be allocated to the terminal 70, and the like. The handover response transmitter 52 transmits a handover response in response to the handover request. The system information transmitter 58 transmits a system information (SU-1 signal) containing access information through a common channel. When it is judged that a handover can be performed with respect to a handover request received by the handover request receiver 48, the system information transmitter 58 reduces the transmission interval of the system information so as to be shorter than the gap period. The RACH preamble receiver 56 receives a RACH preamble transmitted from the terminal 70.

Figure 8:
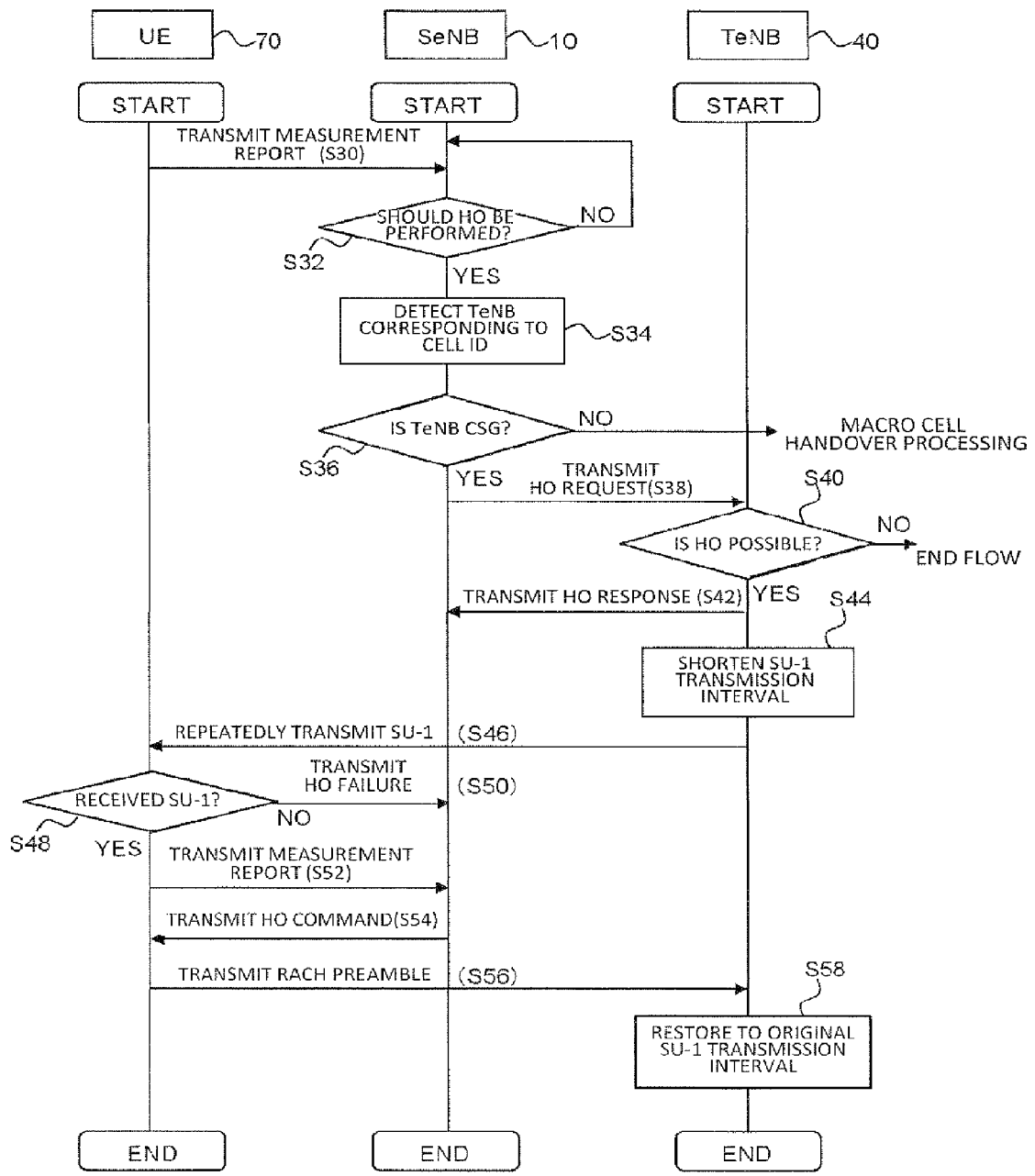
FIG. 8 is a diagram illustrating operations during a handover according to the second embodiment.

FIG. 8 is a flow chart illustrating operations during a handover by the radio communication system according to the second embodiment. The terminal 70 transmits a measurement report to the SeNB 10 currently engaged in communication (S30). The SeNB 10 compares the reception quality of a radio wave from the SeNB 10 with the reception quality of a radio wave from the TeNB 40 to judge whether or not a handover should be performed (S32). When it is judged that a handover should not be performed (NO in S32), the SeNB 10 awaits the reception of a next measurement report.

When it is judged that a handover should be performed (YES in S32), the SeNB 10 extracts a TeNB 40 having an identifier corresponding to the cell ID notified in the measurement report from the NCL 16 (S34). Subsequently, when the TeNB is a CSG cell (YES in S36), the SeNB 10 transmits a handover request to the extracted TeNB 40 of the CSG cell C2 (S38). When the TeNB is not a CSG cell (NO in S36), a handover of the macro cell is performed.

The TeNB 40 having received the handover request judges whether a handover can be performed or not (S40). When a handover can be performed (YES in S40), the TeNB 40 transmits a handover response to the SeNB 10 (S42). When a handover cannot be performed (NO in S40), the radio communication system does not perform operations of step S42 and thereafter and terminates the flow. When a handover can be performed, the TeNB 40 sets the transmission interval of the SU-1 signal shorter than before receiving the handover request (S44), and repeatedly transmits the SU-1 signal (S46).

The terminal 70 judges whether the SU-1 signal has been received or not (S48). If the SU-1 cannot be received over a certain period of time (NO in S48), a judgment of handover failure is made and transmitted to the SeNB (S50). In this case, "a certain period of time" signifies a period of time corresponding to an interval between gap periods. When the SU-1 signal is transmitted during a gap period, the terminal 70 can receive the SU-1 signal. When the SU-1 signal is judged to be received (YES in S48), the terminal 70 reads out a TAID of the TeNB 40 from the SU-1 signal. The terminal 70 compares the TAID of the TeNB 40 with its own TAID and judges whether access to the TeNB 40 is permitted or not. The terminal 70 transmits a measurement report containing an access permission judgment result to the SeNB 10 (S52).

Upon receiving the measurement report from the terminal 70, the SeNB 10 judges whether access to the TeNB 40 is permitted or not based on the measurement report. When access by the terminal 70 is permitted, the SeNB 10 transmits a handover command to the terminal 70 (S54). Upon receiving the handover command, the terminal 70 starts processing for a handover. Specifically, the terminal 70 transmits a RACH preamble for starting uplink synchronization to the TeNB 40 (S56), and starts processing to connect to the TeNB 40. Upon receiving the RACH preamble, the TeNB 40 restores the transmission interval of the SU-1 signal to the interval prior to the start of handover processing (S58). This concludes the description of the radio communication system according to the second embodiment.

The TeNB 40 according to the second embodiment adopts a configuration that shortens the transmission interval of an SU-1 signal to be transmitted to the terminal 70 as compared to before receiving a handover request when it is judged that a handover can be performed. Therefore, the terminal 70 is able to reliably receive the SU-1 signal containing access information transmitted from the TeNB 40 during a first gap period after shortening the transmission interval.

Figure 9:
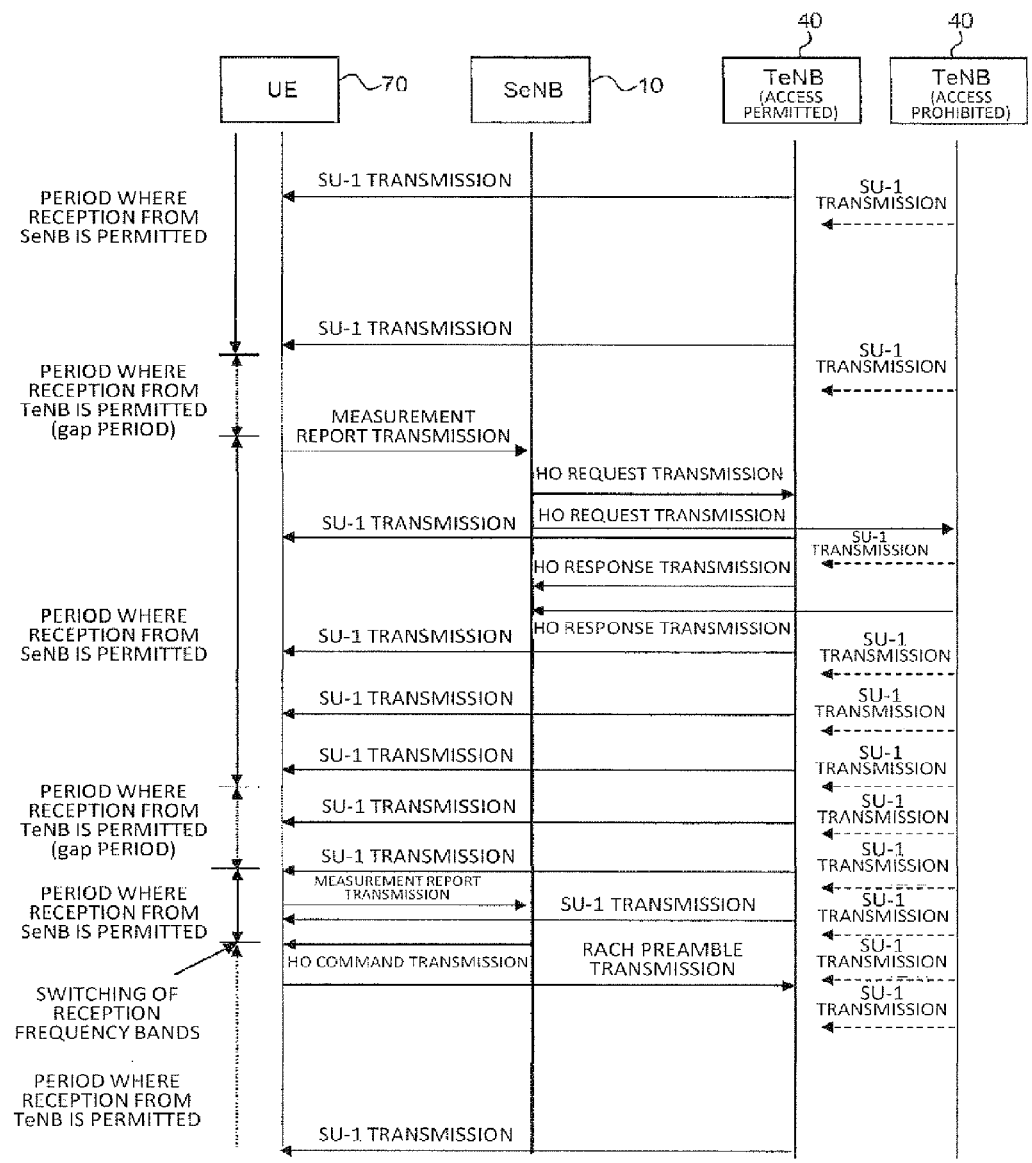
FIG. 9 is a diagram illustrating an example of a flow of signals transmitted and received during a handover according to the second embodiment.
Figure 10:
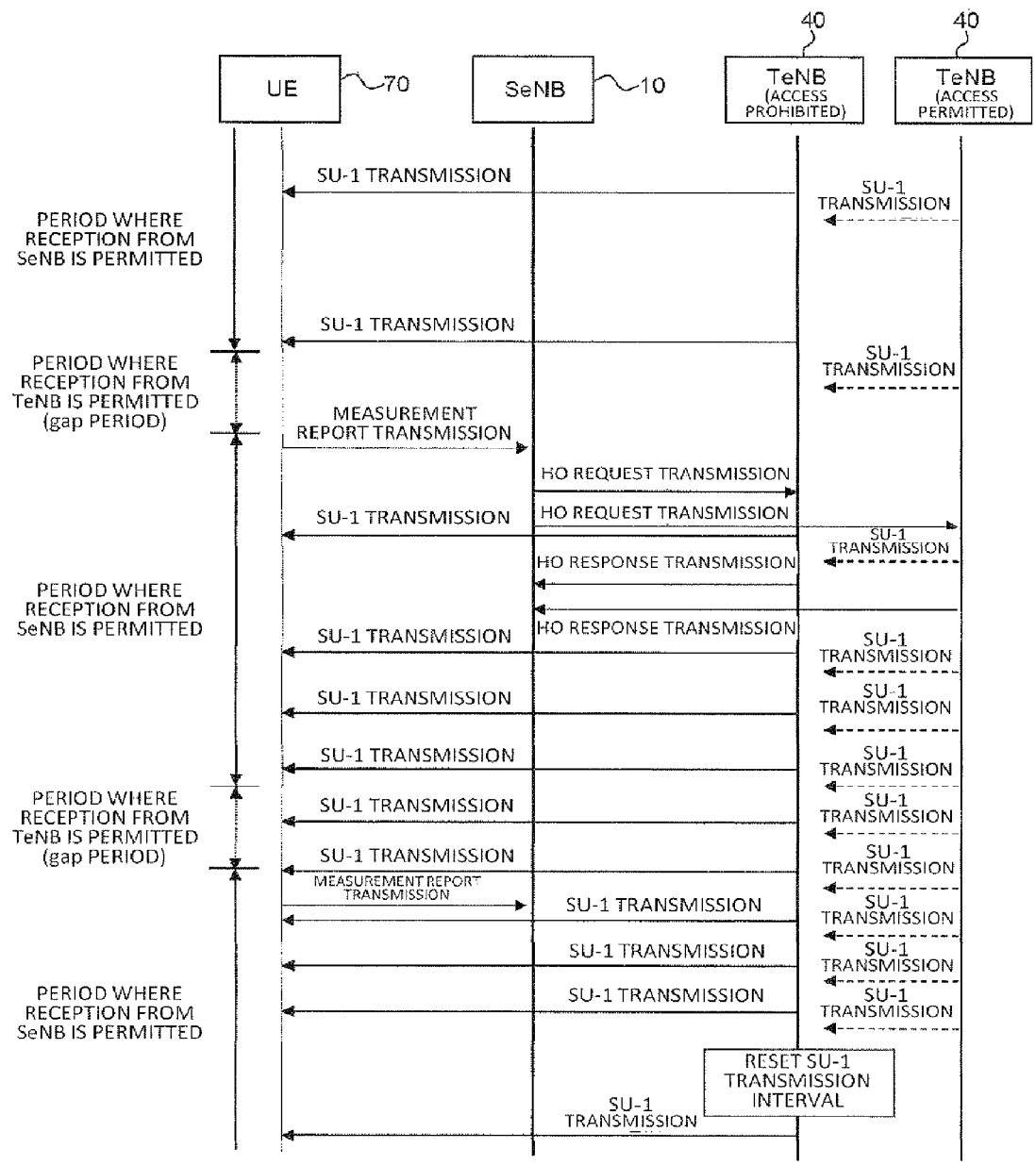
FIG. 10 is a diagram illustrating an example of a flow of signals transmitted and received during a handover according to the second embodiment.

FIGS. 9 and 10 are diagrams illustrating an example of a flow of signals transmitted and received during a handover by the radio communication system according to the second embodiment. FIG. 9 illustrates a flow of signals when the terminal 70 approaches a TeNB 40 to which access is permitted. FIG. 10 illustrates a flow of signals when the terminal 70 approaches a TeNB 40 to which access is not permitted.

As illustrated in FIG. 9, since the TeNB 40 according to the second embodiment transmits the SU-1 signal at an interval that is shorter than the gap period after receiving the handover request and returning a handover response, the terminal 70 can receive the SU-1 signal transmitted from the access-permitted TeNB 40 during a first gap period after shortening the transmission interval of the SU-1 signal. Accordingly, a handover can be performed in a short period of time.

As illustrated in FIG. 10, in the second embodiment, since an SU-1 signal is also transmitted from a TeNB 40 to which access from the terminal 70 is not permitted at an interval shorter than the gap period, the terminal 70 is able to know that access to the TeNB 40 is not permitted upon receiving the SU-1 signal based on access information included in the SU-1 signal.

As illustrated in FIG. 10, the terminal 70 does not transmit a RACH preamble to a TeNB 40 to which access is not permitted. In addition, as similarly illustrated in FIG. 10, the terminal 70 does not transmit a RACH preamble to a TeNB 40 to which access is permitted when the terminal 70 is remote from the TeNB 40. The TeNB 40 may use a timer as a trigger to restore the transmission interval of the SU-1 signal to its original interval. In other words, the TeNB 40 performs processing for restoring the original transmission interval of the SU-1 signal upon the lapse of a certain period of time after the transmission interval of the SU-1 signal is shortened. In this case, "a certain period of time" signifies a period of time corresponding to an interval between gap periods.

While an example in which the transmission interval of the SU-1 signal is shortened compared to the gap period has been described above in the present embodiment, the transmission interval of the SU-1 signal after being once shortened may be longer than the gap period. By shortening the transmission interval of the SU-1 signal before receiving the handover request, an advantageous effect can be gained in that the probability of receiving the SU-1 signal can be increased as compared to before receiving the handover request. Such an aspect is also to be included in the present invention.

Figure 11:
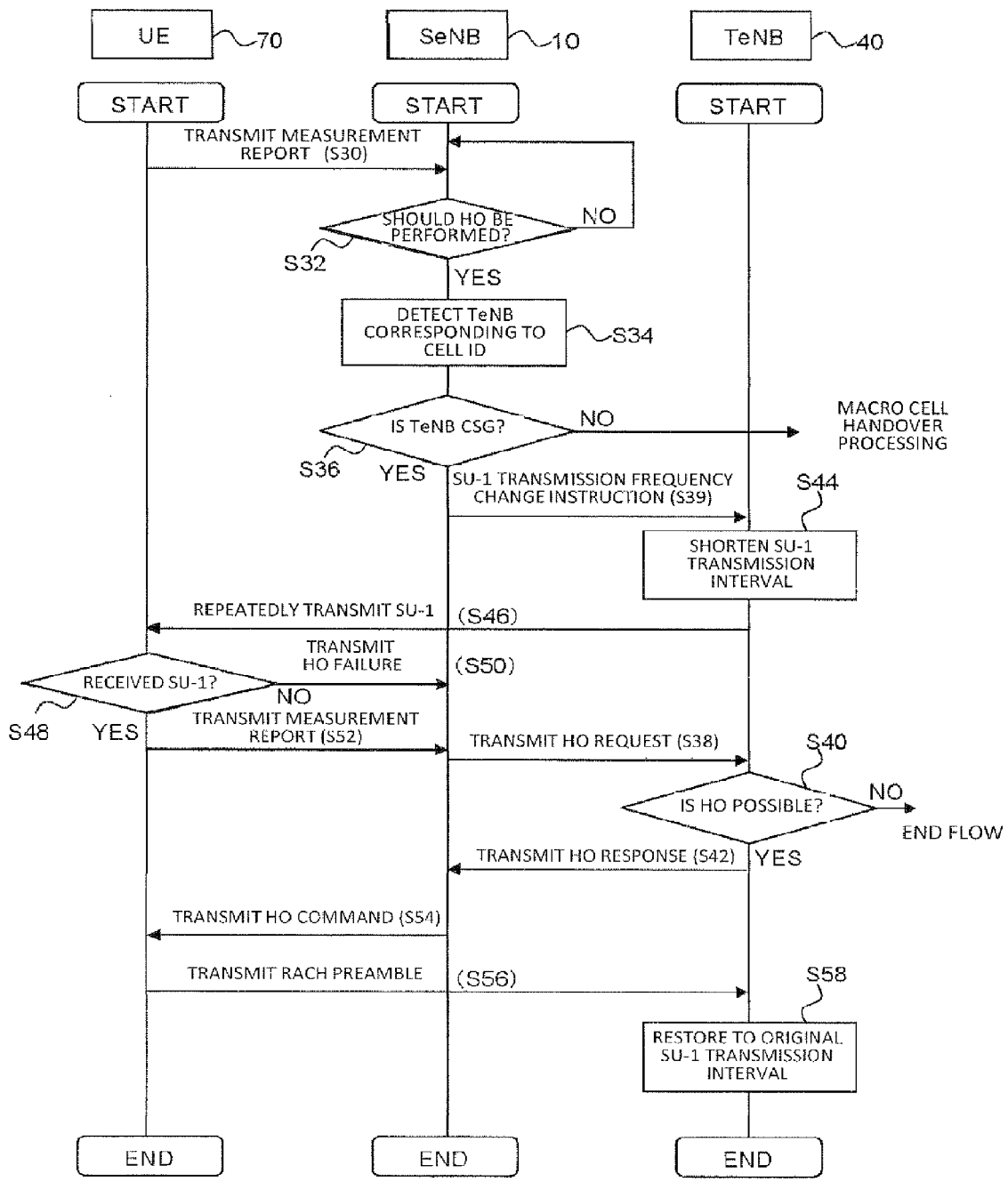
FIG. 11 is a diagram illustrating operations during a handover according to another aspect of the second embodiment.

FIG. 11 is a flow chart illustrating operations during a handover by the radio communication system according to another aspect of the second embodiment. The terminal 70 transmits a measurement report to the SeNB 10 currently engaged in communication (S30). The SeNB 10 receives the measurement report, compares the reception quality of a radio wave from the SeNB 10 with the reception quality of a radio wave from the TeNB 40 to judge whether or not a handover should be performed (S32). When it is judged that a handover should not be performed (NO in S32), the SeNB 10 awaits the reception of a next measurement report.

When it is judged that a handover should be performed (YES in S32), the SeNB 10 extracts a TeNB 40 having an identifier corresponding to the cell ID notified in the measurement report from the NCL 16 (S34). Subsequently, the SeNB judges whether or not the TeNB is a base station of a CSG cell (S36). When the TeNB is a CSG cell (YES in S36), the SeNB 10 transmits an SU-1 transmission frequency change instruction to the extracted TeNB 40 of the CSG cell C2 (S39). When the TeNB is not a CSG cell (NO in S36), a handover of the macro cell is performed.

The TeNB 40 having received the SU-1 transmission frequency change instruction sets the transmission interval of the SU-1 signal shorter than before receiving the handover request (S44), and repeatedly transmits the SU-1 signal (S46).

The terminal 70 judges whether the SU-1 signal has been received or not (S48). When the SU-1 signal is transmitted during a gap period, the terminal 70 can receive the SU-1 signal. When the SU-1 signal is judged to be received (YES in S48), the terminal 70 reads out a TAID of the TeNB 40 from the SU-1 signal. The terminal 70 compares the TAID of the TeNB 40 with its own TAID and judges whether access to the TeNB 40 is permitted or not. The terminal 70 transmits a measurement report containing an access permission judgment result to the SeNB 10 (S52). If the SU-1 cannot be received over a certain period of time (NO in S48), a judgment of handover failure is made and transmitted to the SeNB 10 (S50). In this case, "a certain period of time" signifies a period of time corresponding to an interval between gap periods.

Upon receiving the measurement report from the terminal 70, the SeNB 10 judges whether access to the TeNB 40 is permitted or not based on the measurement report. When access by the terminal 70 is permitted, the SeNB 10 transmits a handover request to the TeNB 40 (S38). The TeNB 40 having received the handover request judges whether a handover can be performed or not (S40), and when a handover can be performed, the TeNB 40 transmits a handover response to the SeNB 10 (S42). Note that FIG. 11 depicts a case where a handover can be performed. When a handover cannot be performed (NO in S40), the radio communication system does not perform operations of step S42 and thereafter and terminates the flow. Upon receiving the handover response from the TeNB 40, the SeNB 10 transmits a handover command to the terminal 70 (S54). Upon receiving the handover command, the terminal 70 starts processing for a handover. Specifically, the terminal 70 transmits a RACH preamble for starting uplink synchronization to the TeNB 40 (S56), and starts processing to connect to the TeNB 40. Upon receiving the RACH preamble, the TeNB 40 restores the transmission interval of the SU-1 signal to the interval prior to the start of handover processing (S58). This concludes the description about the operations during a handover by the radio communication system according to the other aspect of the second embodiment.

According to the other aspect of the second embodiment, the TeNB 40 adopts a configuration that shortens the transmission interval of an SU-1 signal to be transmitted to the terminal 70 as compared to before receiving a handover request when it is judged that a handover can be performed. Therefore, the terminal 70 is able to reliably receive the SU-1 signal containing access information transmitted from the TeNB 40 during a first gap period after shortening the transmission interval.

Figure 12:
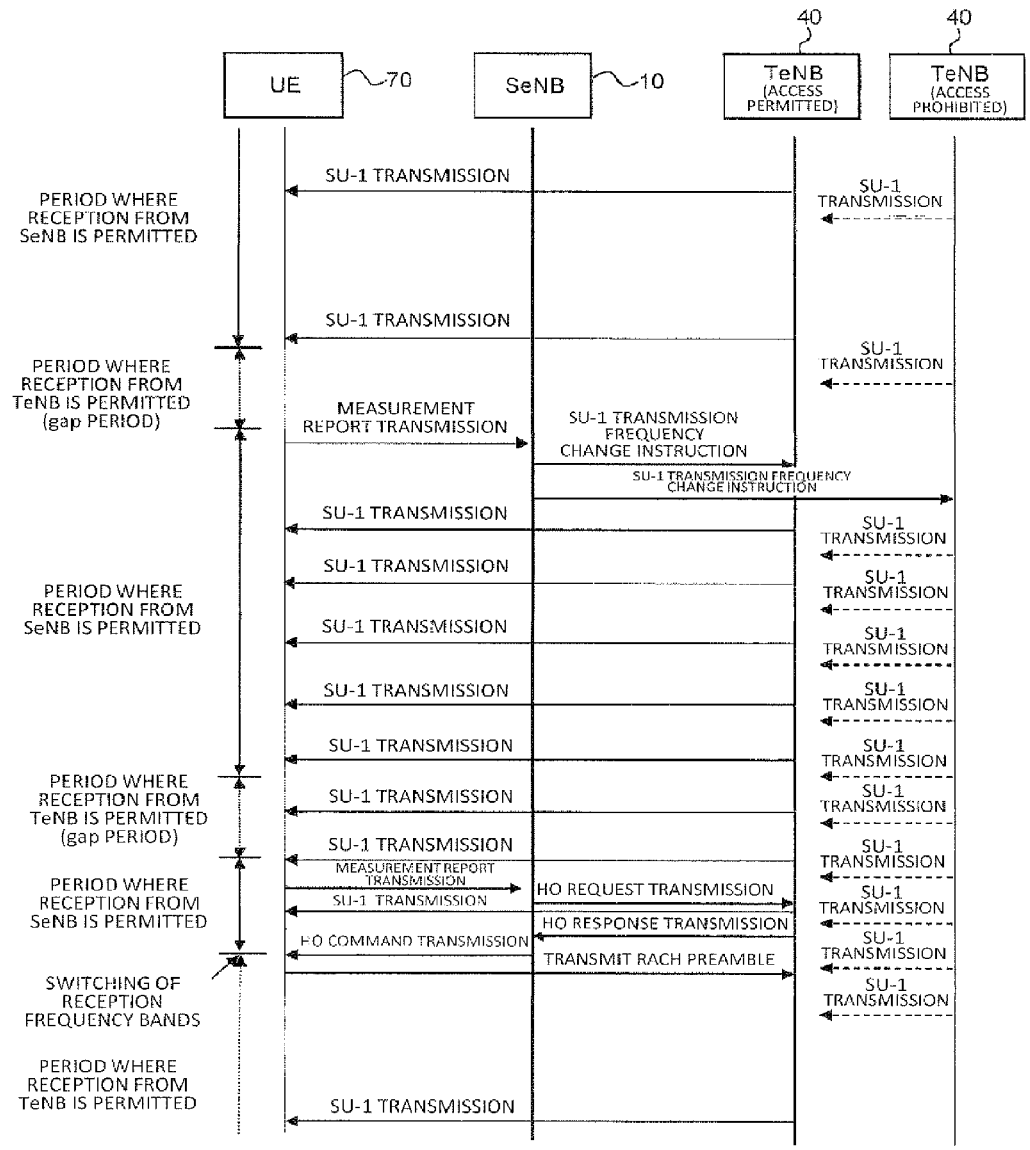
FIG. 12 is a diagram illustrating an example of a flow of signals transmitted and received during a handover according to another aspect of the second embodiment.
Figure 13:
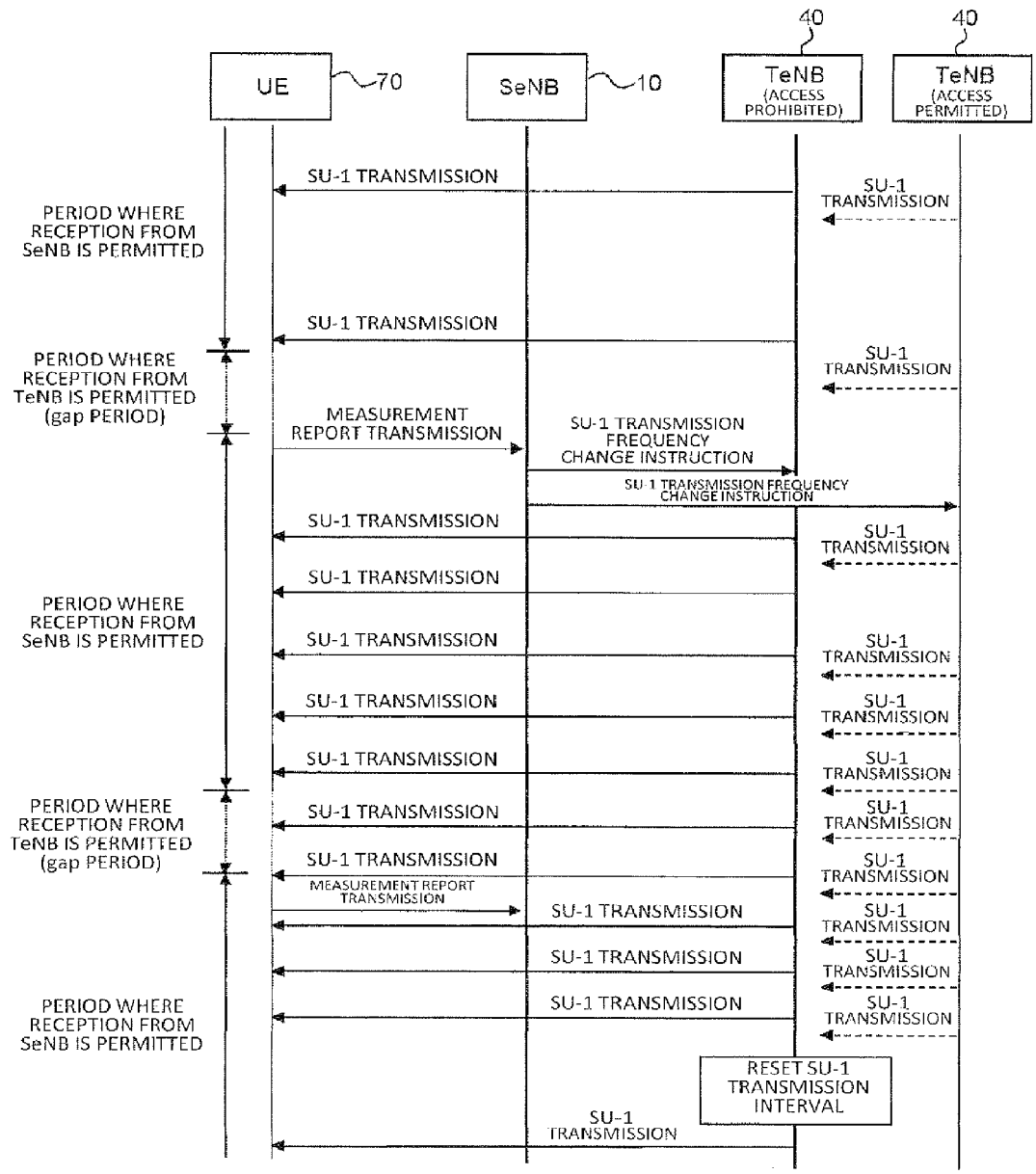
FIG. 13 is a diagram illustrating an example of a flow of signals transmitted and received during a handover according to another aspect of the second embodiment.

FIGS. 12 and 13 are diagrams illustrating an example of a flow of signals transmitted and received during a handover by a radio communication system according to the other aspect of the second embodiment. FIG. 12 illustrates a flow of signals when the terminal 70 approaches a TeNB 40 to which access is permitted, and FIG. 13 illustrates a flow of signals when the terminal 70 approaches a TeNB 40 to which access is not permitted.

As illustrated in FIG. 12, since the TeNB 40 according to the second embodiment transmits the SU-1 signal at an interval that is shorter than the gap period, the terminal 70 can receive a dedicated signal transmitted from the TeNB 40 to which access is permitted during a first gap period after the start of transmission of the dedicated signal. Accordingly, a handover can be performed in a short period of time.

As illustrated in FIG. 13, in the second embodiment, since an SU-1 signal is also transmitted from a TeNB 40 to which access from the terminal 70 is not permitted at an interval shorter than the gap period, the terminal 70 is able to know that access to the TeNB 40 is not permitted upon receiving the SU-1 signal based on access information included in the SU-1 signal.

Moreover, as illustrated in FIG. 13, the terminal 70 does not transmit a RACH preamble to a TeNB 40 to which access is not permitted. As similarly illustrated in FIG. 13, the terminal 70 does not transmit a RACH preamble to a TeNB 40 to which access is permitted when the terminal 70 is remote from the TeNB 40. The TeNB 40 may use a timer as a trigger to restore the transmission interval of the SU-1 signal to its original interval. In other words, the TeNB 40 performs processing for restoring the original transmission interval of the SU-1 signal upon the lapse of a certain period of time after the transmission interval of the SU-1 signal is shortened. In this case, "a certain period of time" signifies a period of time corresponding to an interval between gap periods.

While an example in which the transmission interval of the SU-1 signal is shortened compared to the gap period has been described above in the present embodiment, the transmission interval of the SU-1 signal after being once shortened may be longer than the gap period. By shortening the transmission interval of the SU-1 signal as compared to before receiving the handover request, an advantageous effect can be gained in that the probability of receiving the SU-1 signal can be increased as compared to before receiving the handover request. Such an aspect is also to be included in the present invention.

Third Embodiment

Next, a radio communication system and a base station according to a third embodiment of the present invention will be described. A basic configuration of a base station according to the third embodiment is the same as the basic configuration of the base station according to the second embodiment (refer to FIGS. 6 and 7). However, an SeNB 10 according to the third embodiment differs from the SeNB 10 according to the second embodiment in that when judging that a handover should be performed, the SeNB 10 only transmits a handover request to a TeNB 40 permitting access by a terminal 70 that is a handover object. In the third embodiment, a handover request transmitter 24 determines a TeNB 40 with a TAID that is the same as the TAID of the terminal 70 having transmitted a measurement report based on an NCL 16, and transmits a handover request to the determined TeNB 40.

Figure 14:
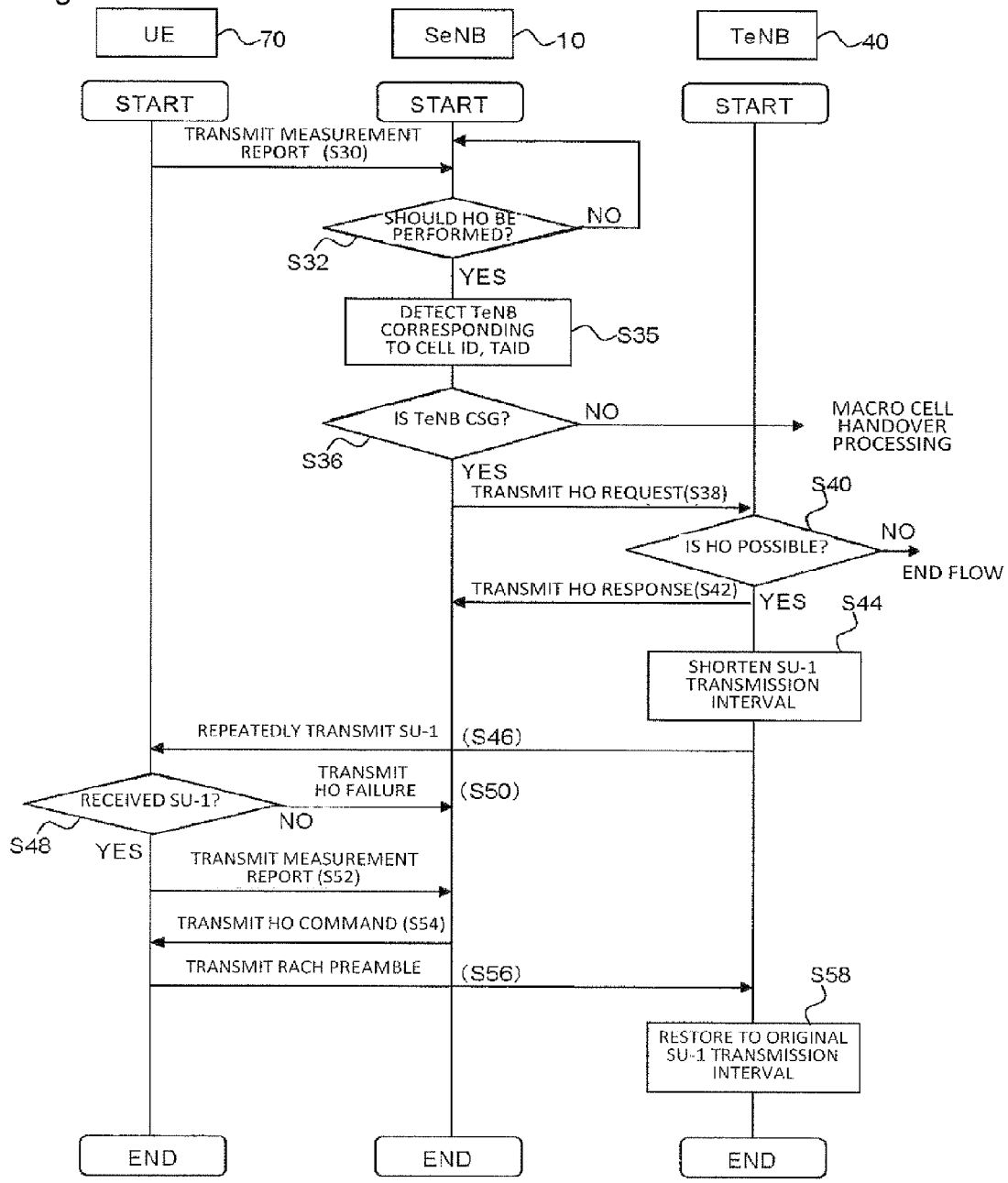
FIG. 14 is a diagram illustrating operations during a handover according to a third embodiment.

FIG. 14 is a flow chart illustrating operations during a handover by the radio communication system according to the third embodiment. Basic operations during a handover by the radio communication system according to the third embodiment are the same as the operations during a handover by the radio communication system according to the second embodiment. The following description will focus on the differences from the operations by the radio communication system according to the second embodiment.

In the radio communication system according to the third embodiment, when the SeNB 10 judges that a handover should be performed (YES in S32), the SeNB 10 extracts TeNBs 40 corresponding to a cell ID notified in the measurement report from the NCL 16. Subsequently, the SeNB 10 determines a TeNB 40 having the same TAID as the TAID of the terminal 70 among the extracted TeNBs 40 (S35), and transmits a handover request to the determined TeNB 40 (S36).

The operation by the TeNB 40 having received the handover request is the same as the second embodiment. A TeNB 40 not having received the handover request does not perform processing related to a handover and transmits an SU-1 signal at a regular interval.

Figure 15:
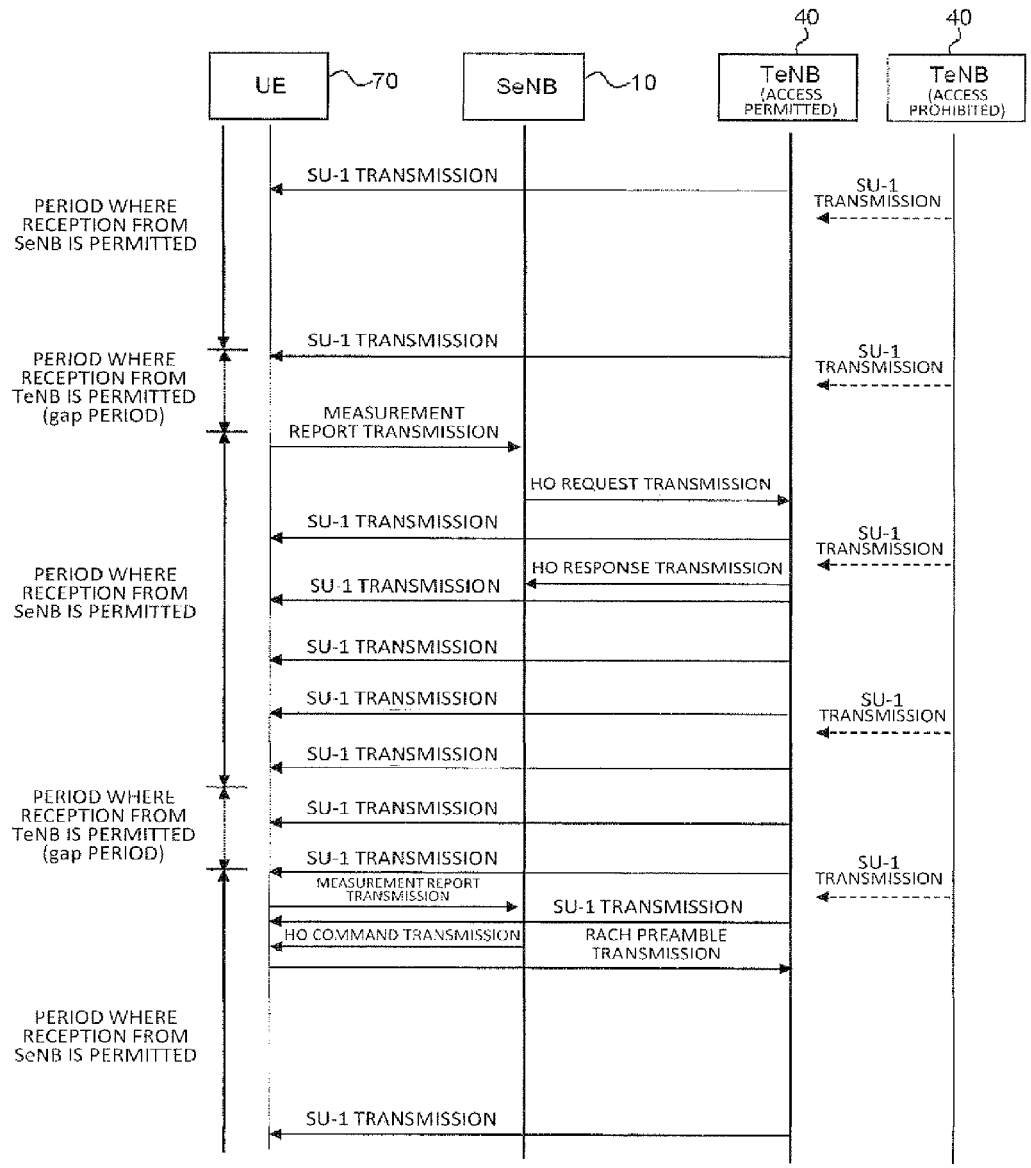
FIG. 15 is a diagram illustrating an example of a flow of signals transmitted and received during a handover according to the third embodiment.

FIG. 15 is a diagram illustrating an example of a flow of signals transmitted and received during a handover by the radio communication system according to the third embodiment. As illustrated in FIG. 15, the SeNB 10 transmits a handover request to a TeNB 40 to which access is permitted and does not transmit a handover request to a TeNB 40 to which access is not permitted. Therefore, a situation where a TeNB 40 not permitting access by the terminal 70 frequently transmits SU-1 signals can be prevented and wasteful use of resources to transmit the SU-1 signals can be avoided.

When the terminal 70 is approaching a CSG cell C2 to which access is not permitted and has distanced itself from a CSG cell C1 to which access is permitted, the terminal 70 is unable to receive an SU-1 signal. When the terminal 70 does not receive an SU-1 signal for a certain period of time or, in other words, when a RACH preamble has not been transmitted even though a certain period of time has lapsed after shortening the transmission interval of the SU-1 signal, the TeNB 40 restores the transmission interval of the SU-1 signal to the original interval.

Figure 16:
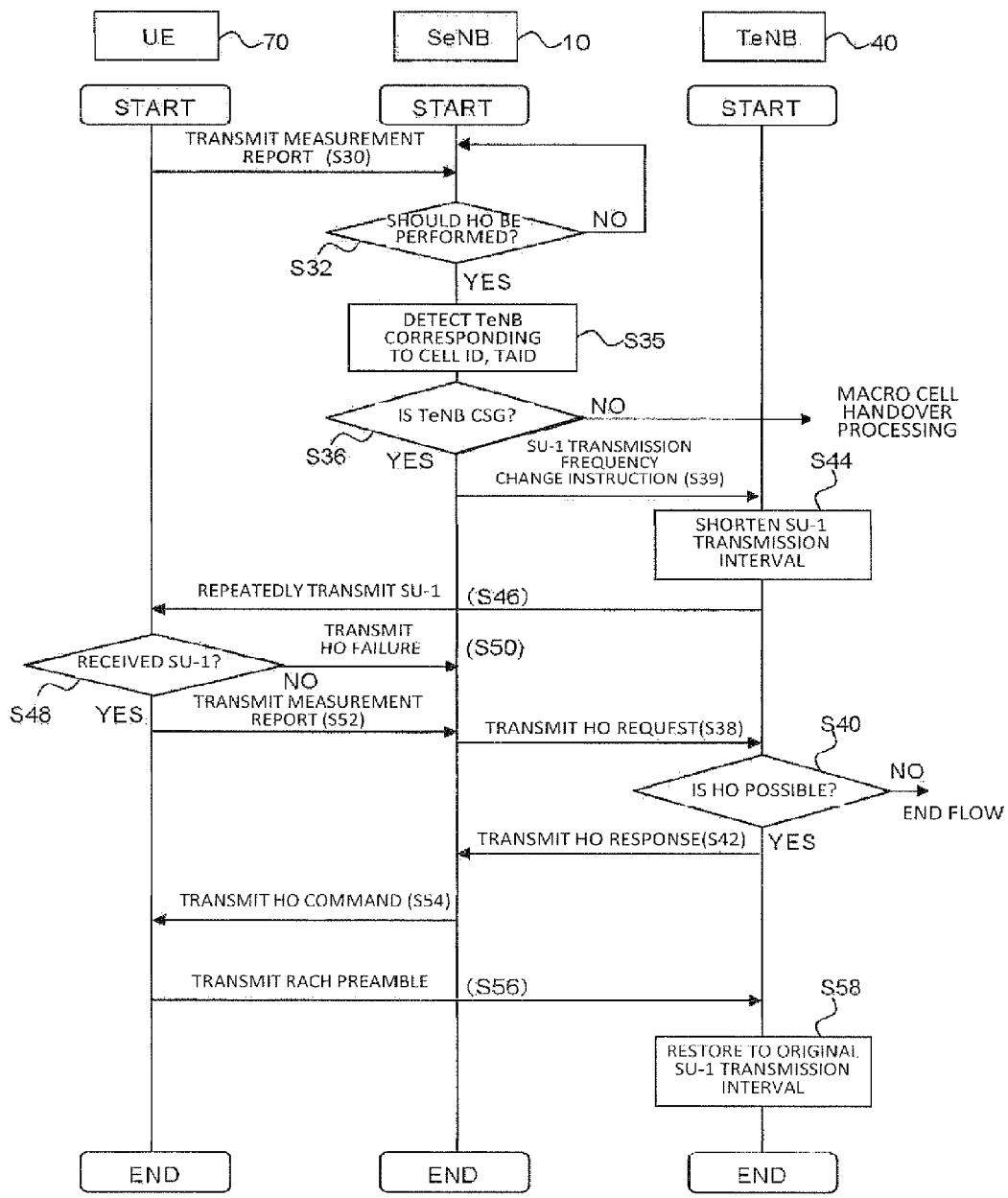
FIG. 16 is a diagram illustrating operations during a handover according to another aspect of the third embodiment.

FIG. 16 is a flow chart illustrating operations during a handover by the radio communication system according to another aspect of the third embodiment. Basic operations during a handover by the radio communication system according to the third embodiment are the same as the operations during a handover by the radio communication system according to the second embodiment. The following description will focus on the differences from the operations by the radio communication system according to the second embodiment.

With the radio communication system according to the third embodiment, when the SeNB 10 judges that a handover should be performed (YES in S32), the SeNB 10 extracts TeNBs 40 corresponding to a cell ID notified in the measurement report from the NCL 16. Subsequently, the SeNB 10 determines a TeNB 40 having the same TAID as the TAID of the terminal 70 among the extracted TeNBs 40 S35), and transmits an SU-1 transmission frequency change instruction to the determined TeNB 40 (S39).

The operation by the TeNB 40 having received the SU-1 transmission frequency change instruction is the same as the second embodiment (refer to FIG. 11). A TeNB 40 not having received the SU-1 transmission frequency change instruction does not perform processing related to a handover and transmits an SU-1 signal at a regular interval.

Figure 17:
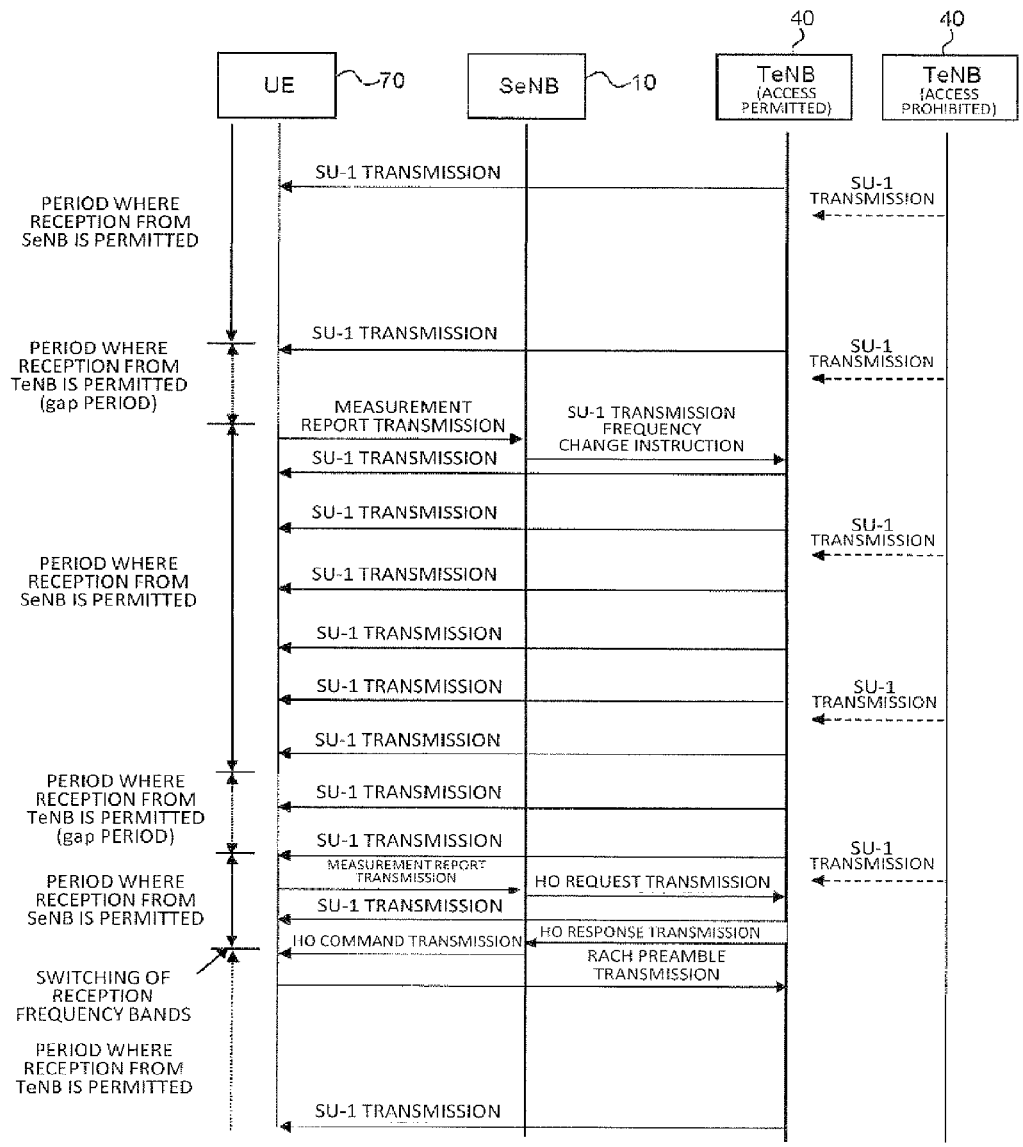
FIG. 17 is a diagram illustrating an example of a flow of signals transmitted and received during a handover according to another aspect of the third embodiment.

FIG. 17 is a diagram illustrating an example of a flow of signals transmitted and received during a handover by a radio communication system according to the other aspect of the third embodiment. As illustrated in FIG. 17, the SeNB 10 transmits an SU-1 transmission frequency change instruction to a TeNB 40 to which access is permitted and does not transmit an SU-1 transmission frequency change instruction to a TeNB 40 to which access is not permitted. Therefore, a situation where a TeNB 40 not permitting access by the terminal 70 frequently transmits SU-1 signals can be prevented and wasteful use of resources to transmit the SU-1 signals can be avoided.

When the terminal 70 is approaching a CSG cell C2 to which access is not permitted and has distanced itself from a CSG cell C1 to which access is permitted, the terminal 70 is unable to receive an SU-1 signal. When the terminal 70 does not receive an SU-1 signal for a certain period of time or, in other words, when a RACH preamble has not been transmitted even though a certain period of time has lapsed after shortening the transmission interval of the SU-1 signal, the TeNB 40 restores the transmission interval of the SU-1 signal to the original interval.

Fourth Embodiment

Next, a radio communication system and a base station according to a fourth embodiment of the present invention will be described. A basic configuration of a base station according to the fourth embodiment is the same as the basic configuration of the base station according to the third embodiment (refer to FIGS. 6 and 7). However, the fourth embodiment differs from the third embodiment in that after receiving a handover response, an SeNB 10 immediately transmits a handover command to a terminal 70. In this case, the handover command contains an instruction to have the terminal 70 receive an SU-1.

The fourth embodiment also differs from the third embodiment in that the transmission frequency of an SU-1 signal is not changed. Accordingly, the terminal 70 having received a handover command starts receiving an SU-1 signal from the TeNB 40 after receiving the handover command. After receiving the SU-1 signal, the terminal 70 compares the TAID of the TeNB 40 with its own TAID and judges whether access to the TeNB 40 is permitted or not. When access is permitted, the terminal 70 transmits a RACH preamble to the TeNB 40, and if not, transmits a handover failure to an SeNB. Consequently, the period of time required by the handover can be reduced significantly when the terminal 70 is approaching a CSG cell to which access is permitted.

Figure 18:
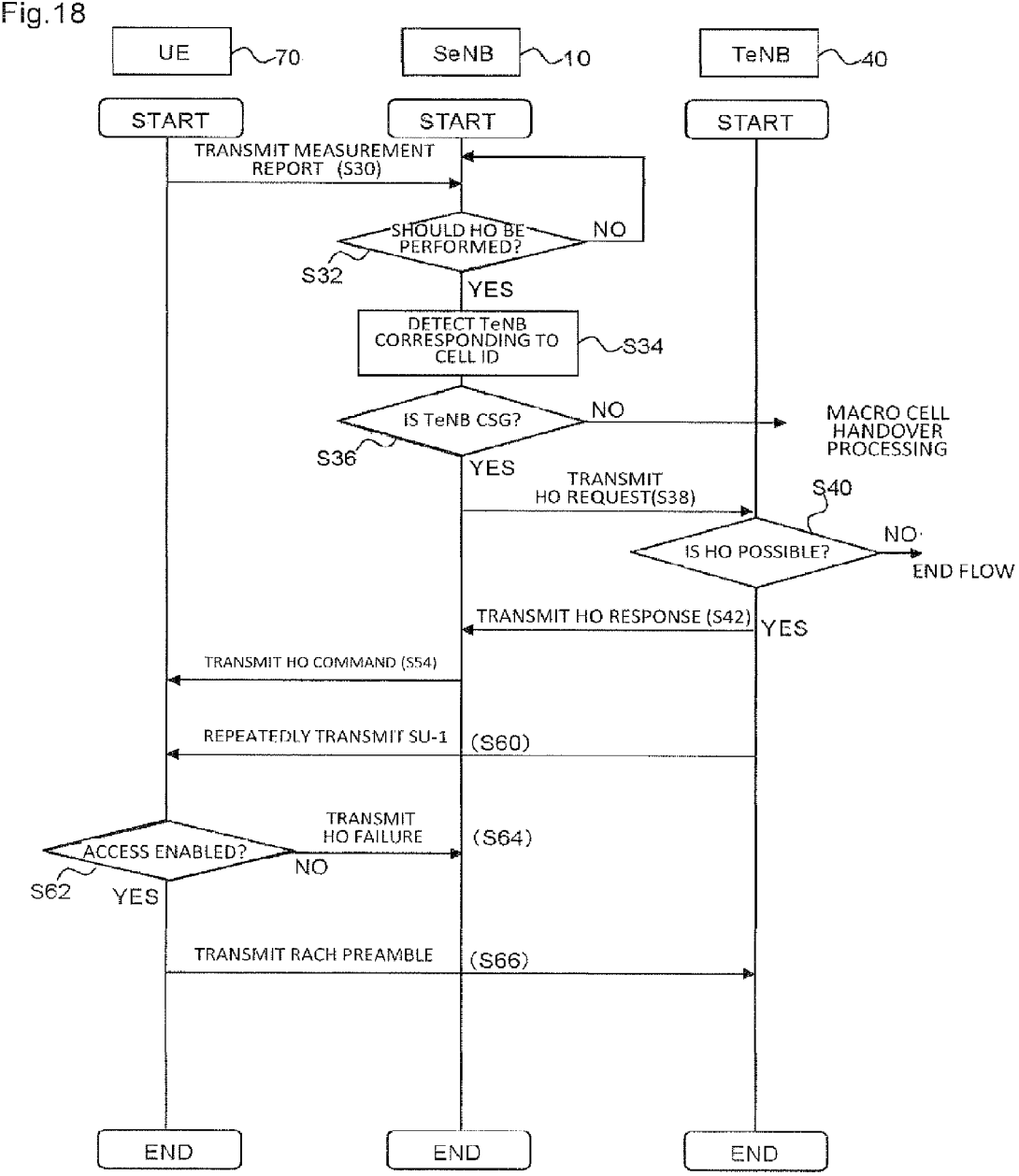
FIG. 18 is a diagram illustrating operations during a handover according to a fourth embodiment.

FIG. 18 is a flow chart illustrating operations during a handover by the radio communication system according to the fourth embodiment. The terminal 70 transmits a measurement report to the SeNB 10 currently engaged in communication (S30). The SeNB 10 compares the reception quality of a radio wave from the SeNB 10 with the reception quality of a radio wave from the TeNB 40 to judge whether or not a handover should be performed (S32). When it is judged that a handover should not be performed (NO in S32), the SeNB 10 awaits the reception of a next measurement report.

When it is judged that a handover should be performed (YES in S32), the SeNB 10 extracts a TeNB 40 having an identifier corresponding to the cell ID notified in the measurement report from the NCL 16 (S34). Subsequently, the SeNB 10 judges whether or not the TeNB is a base station of a CSG cell (S36). When the TeNB is a CSG cell (YES in S36), the SeNB 10 transmits a handover request to the extracted TeNB 40 of the CSG cell C2 (S38). When the TeNB is not a CSG cell (NO in S36), a handover of the macro cell is performed.

The TeNB 40 having received the handover request judges whether a handover can be performed or not (S40), and when a handover can be performed, the TeNB 40 transmits a handover response to the SeNB 10 (S42). When a handover cannot be performed (NO in S38), the radio communication system does not perform operations of step S40 and thereafter and terminates the flow.

Upon receiving the handover response, the SeNB 10 transmits a handover command to the terminal 70 (S54). The handover command contains an instruction to the terminal to receive an SU-1 signal. Having received the handover command, the terminal 70 starts reception processing for the SU-1 signal and receives the SU-1 signal. Since the terminal 70 can receive the SU-1 signal at a transmission frequency band of the TeNB 40 after receiving the handover command, a gap period need not be set to receive a signal from the TeNB 40. Therefore, the terminal 70 is capable of receiving the SU-1 signal from the TeNB 40 by normal reception processing that does not involve providing a gap period. The terminal 70 reads out a TAID of the TeNB 40 from the SU-1 signal. The terminal 70 compares the TAID of the TeNB 40 with its own TAID and judges whether access to the TeNB 40 is permitted or not (S62). If access to the TeNB 40 has been permitted (YES in S62), a RACH preamble for starting uplink synchronization is transmitted to the TeNB 40 (S66). On the other hand, if access to the TeNB 40 is not permitted (NO in S64), a judgment of handover failure is made and transmitted to the SeNB 10 (S47). This concludes the description of the radio communication system according to the fourth embodiment.

In the fourth embodiment, since the terminal 70 switches reception frequency bands by having the SeNB 10 instruct the terminal 70 with a handover command to receive an SU-1 signal, the SU-1 signal can be received without using a gap period. Accordingly, the terminal 70 can now reliably perform access confirmation without having the TeNB 40 change the transmission interval of an SU-1 signal, thereby enabling a reduction in handover time.

Figure 19:
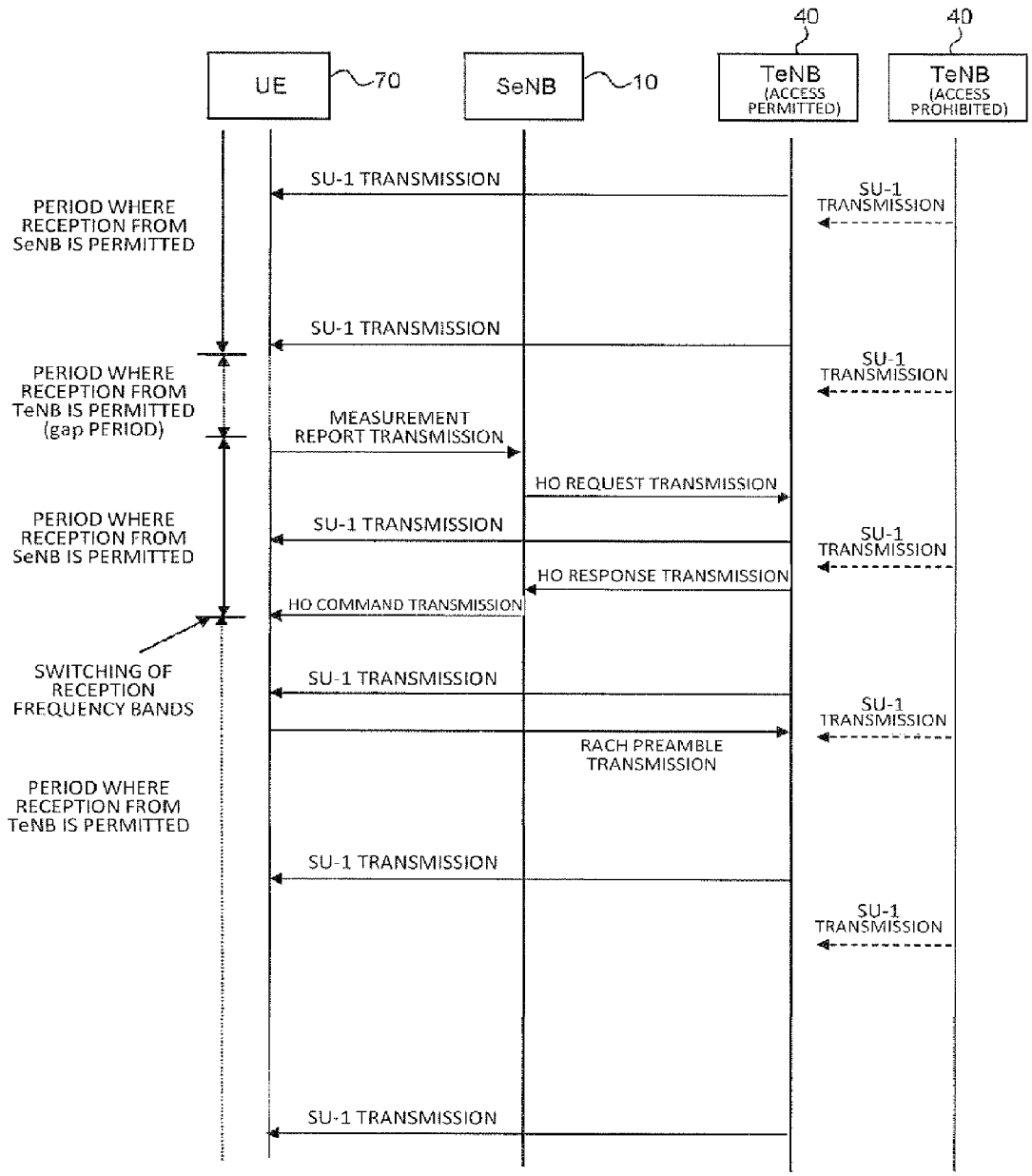
FIG. 19 is a diagram illustrating an example of a flow of signals transmitted and received during a handover according to the fourth embodiment.
Figure 20:
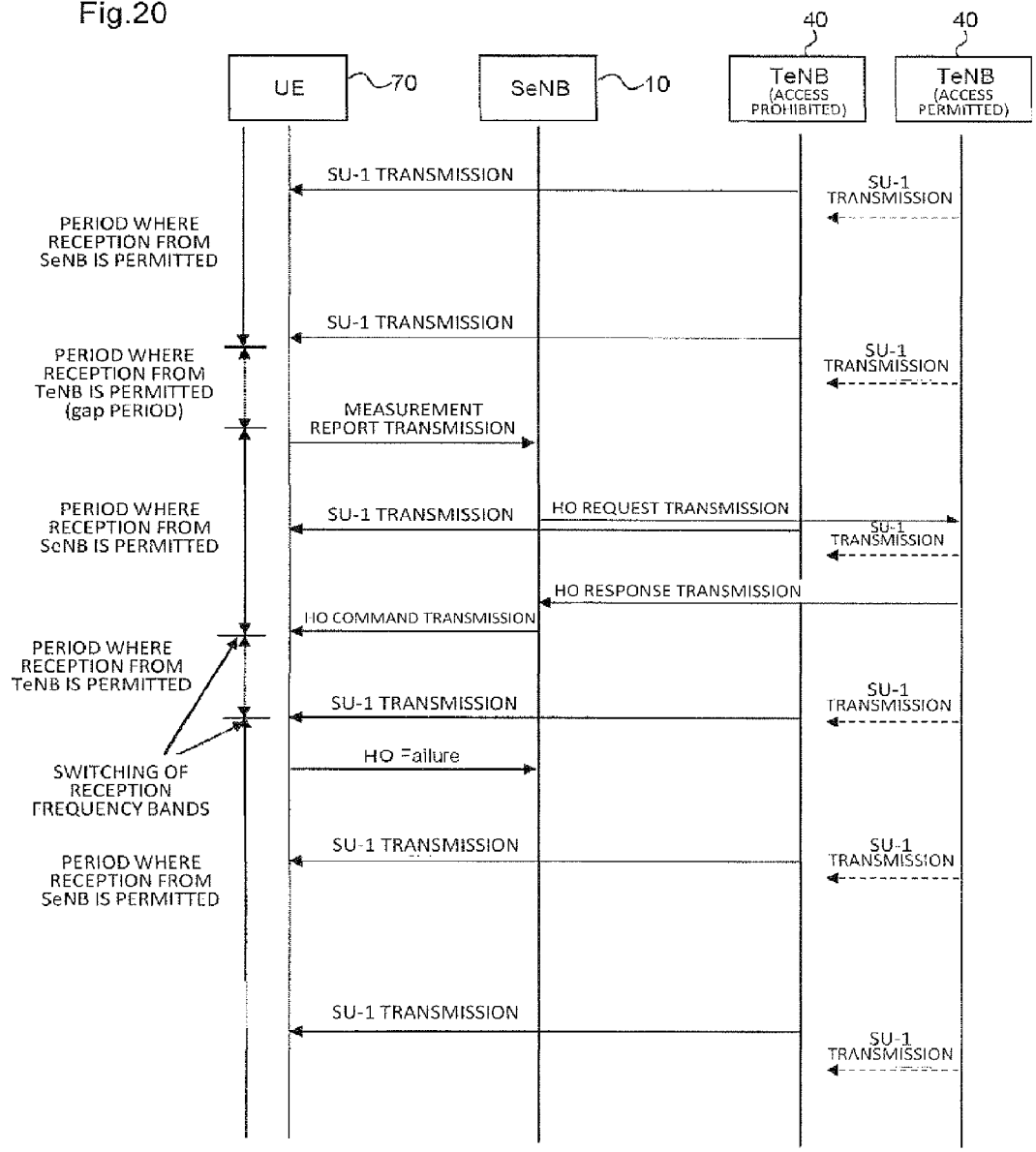
FIG. 20 is a diagram illustrating an example of a flow of signals transmitted and received during a handover according to the fourth embodiment.
Figure 21:
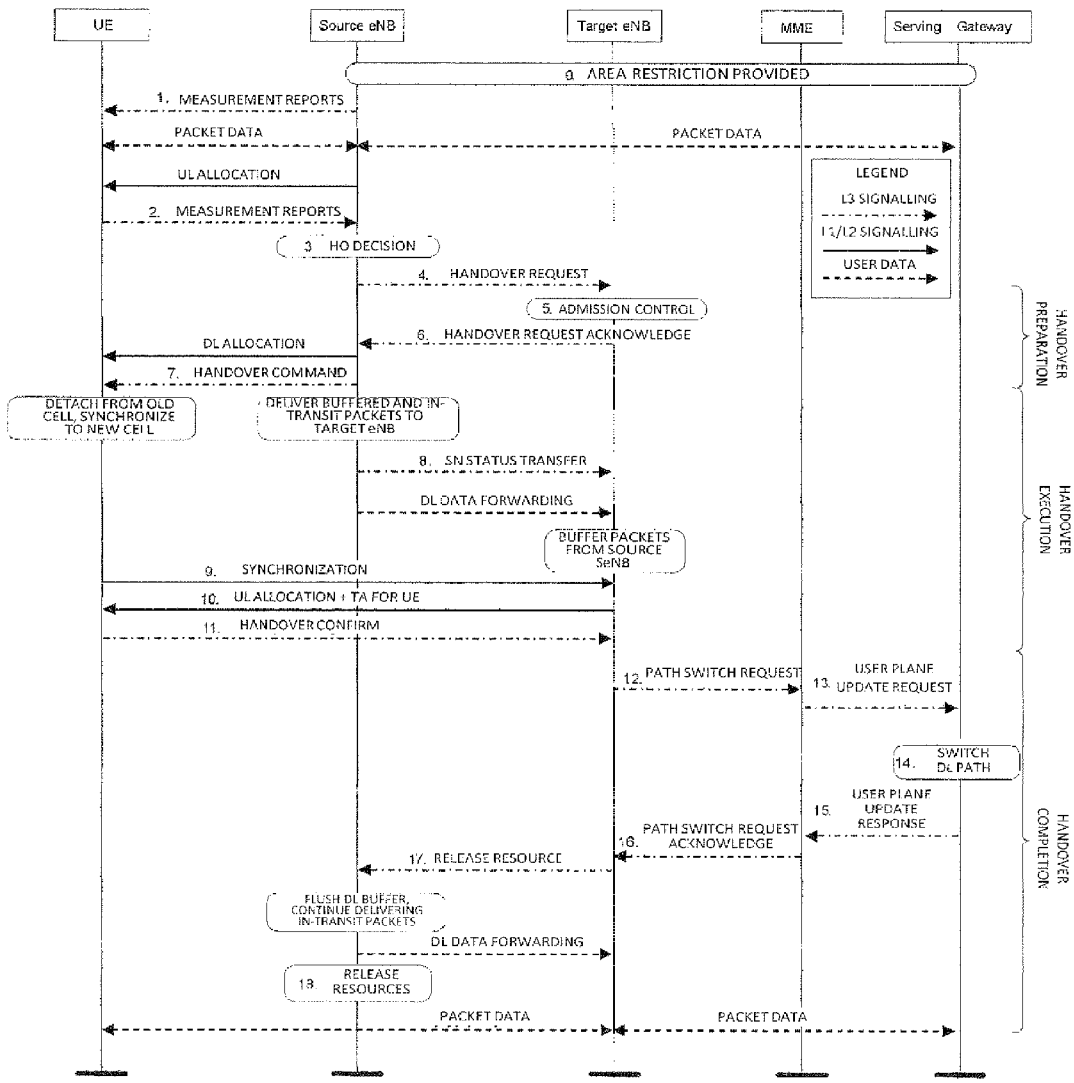
FIG. 21 is a flow chart of a handover described in "3GPP TS 36.300 V8.3.0"
Figure 22:
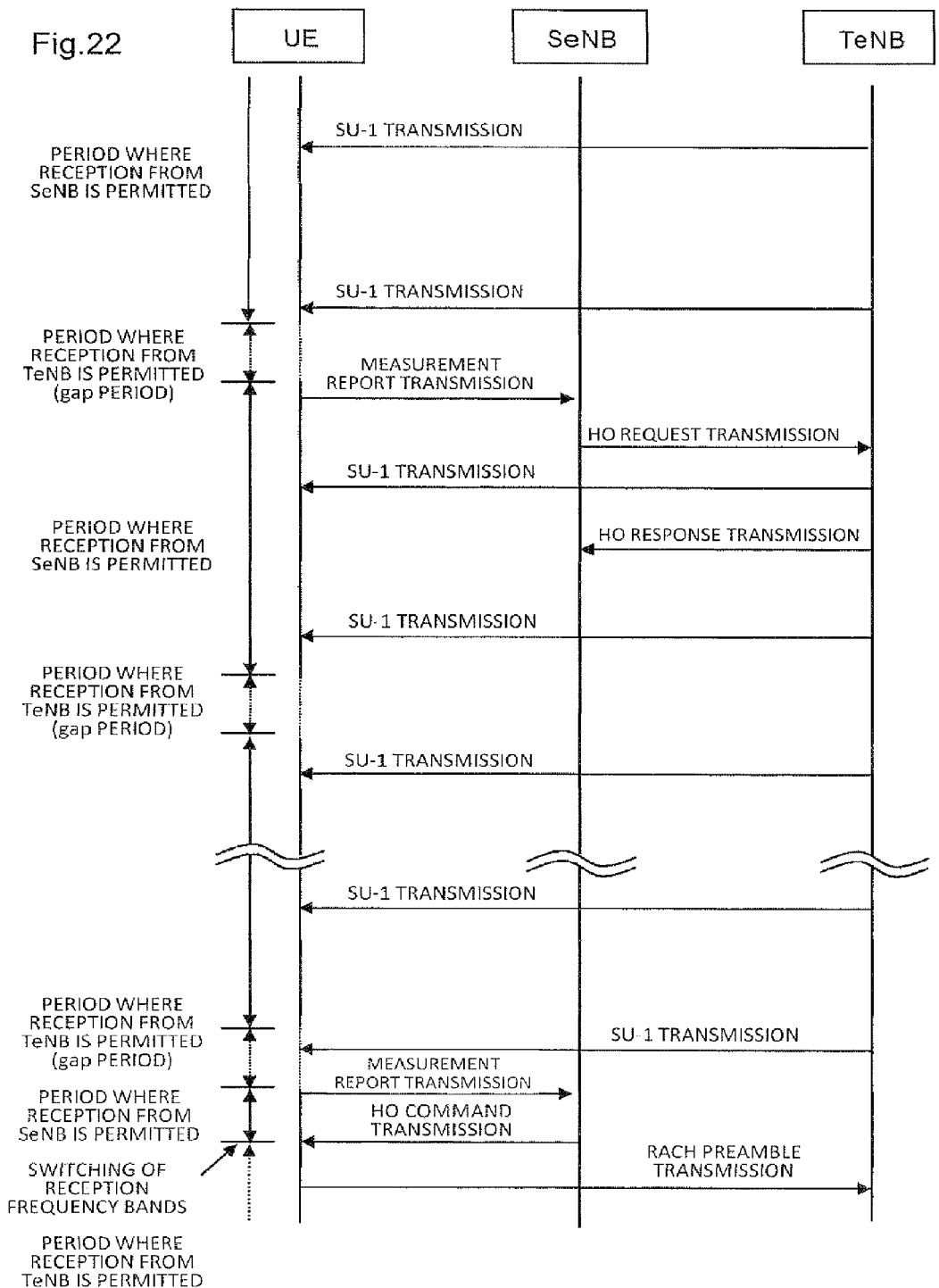
FIG. 22 is a virtual diagram illustrating operations during a handover from a base station of a macro cell to a base station of a CSG cell.

FIGS. 19 and 20 are diagrams illustrating an example of a flow of signals transmitted and received during a handover by the radio communication system according to the fourth embodiment. FIG. 19 illustrates a flow of signals when the terminal 70 approaches a TeNB 40 to which access is permitted, and FIG. 20 illustrates a flow of signals when the terminal 70 approaches a TeNB 40 to which access is not permitted.

As illustrated in FIG. 19, the terminal 70 according to the fourth embodiment can receive an SU-1 signal without using a gap period. Accordingly, a handover can be performed in a short period of time.

Moreover, as illustrated in FIG. 20, the terminal 70 does not transmit a RACH preamble to a TeNB 40 to which access is not permitted. In addition, as similarly illustrated in FIG. 20, the terminal 70 also does not transmit a RACH preamble to a TeNB 40 to which access is permitted when the terminal 70 is remote from the TeNB 40.

While a detailed description of a base station, a radio communication system, and a handover method according to the present invention has been given by citing embodiments thereof, the present invention is not limited to the embodiments described above. While examples in which access information is notified to a terminal using a dedicated signal or an SU-1 signal have been described in the embodiments presented above, access information may also be notified to the terminal by other signals. In this case, the period of time required by a handover can be reduced by shortening a transmission interval of a signal for notifying access information as compared to before receiving a handover request or, preferably, by setting the transmission interval so as to be shorter than a gap period.

Fifth Embodiment

Next, a radio communication system and a base station according to a fifth embodiment of the present invention will be described. A radio communication system according to the fifth embodiment reduces the period of time required by a handover by controlling the timing of a gap period of a terminal.

Figure 23:
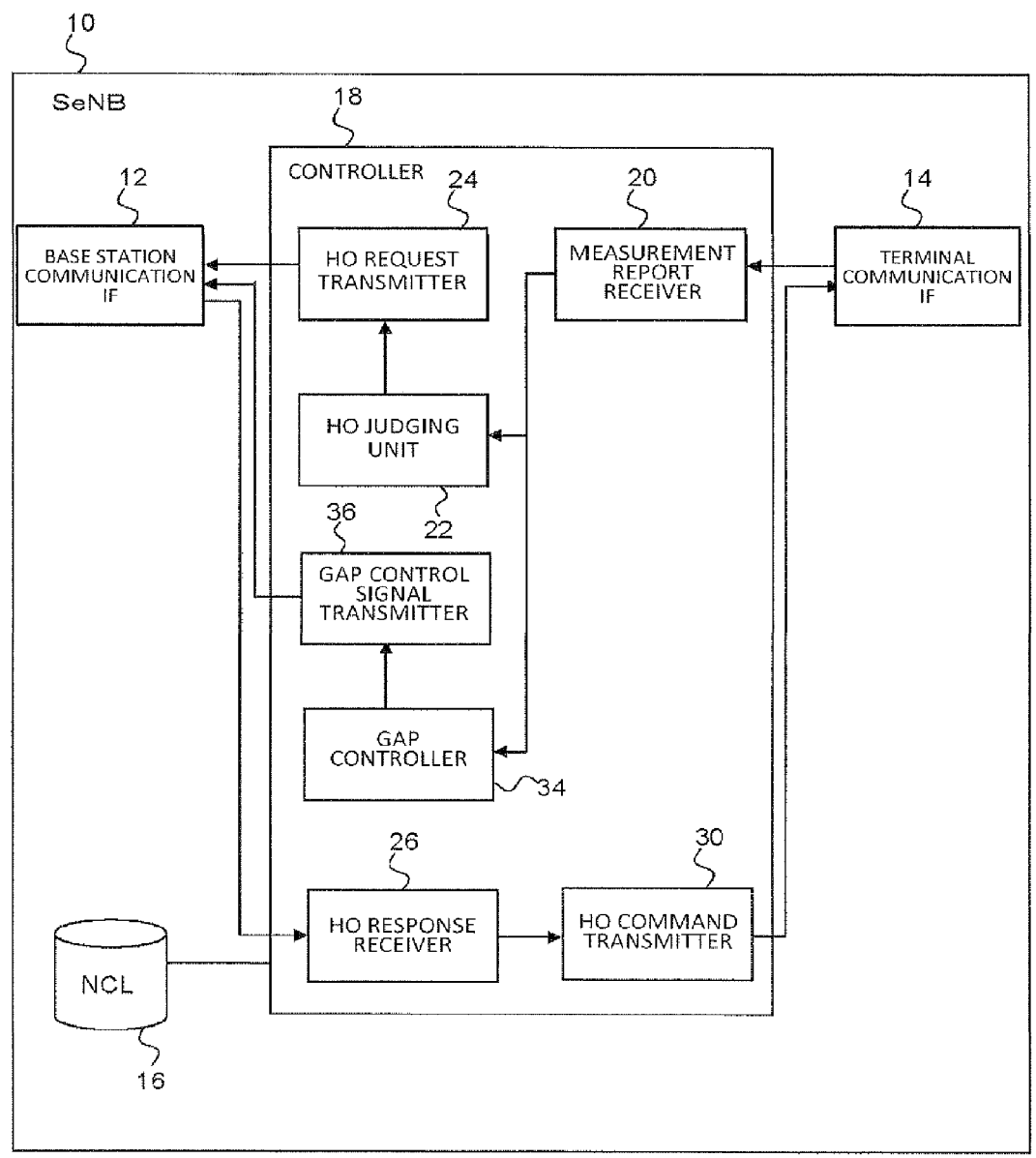
FIG. 23 is a diagram illustrating a configuration of an SeNB according to a fifth embodiment.

FIG. 23 is a diagram illustrating a configuration of a base station (SeNB) 10 that is a handover source. The SeNB 10 comprises a base station communication interface 12 that is a communication interface with a TeNB 40 of a CSG cell C2, a terminal communication interface 14 that is a communication interface with a terminal 70, an NCL 16 storing information on neighboring cells, and a controller 18 that controls communication with the TeNB 40 and the terminal 70. The NCL 16 contains cell IDs, access information (TAID), and the like of base stations neighboring the SeNB 10.

The controller 18 comprises a measurement report receiver 20, a handover judging unit 22, a handover request transmitter 24, a handover response receiver 26, a handover command transmitter 30, a gap controller 34, and a gap control signal transmitter 36. Moreover, while FIG. 23 illustrates a configuration necessary for performing a handover, the SeNB 10 has configurations necessary for communication control and the like in addition to the configuration described above.

The measurement report receiver 20, the handover judging unit 22, the handover request transmitter 24, the handover response receiver 26, and the handover command transmitter 30 have the same functions as the respective components comprising the SeNB 10 described with reference to FIG. 6. Based on a timing difference between a timing of a gap period included in a measurement report from the measurement report receiver 20 and a frame timing of the TeNB 40, the gap controller 34 delays the timing of the gap period of the terminal so as to coincide with a transmission timing of an SU-1 signal of the TeNB 40. The gap control signal transmitter 36 notifies the gap period timing newly set by the gap controller 34 to match the timings of gap periods of the base station 10 and the terminal 70.

Figure 24:
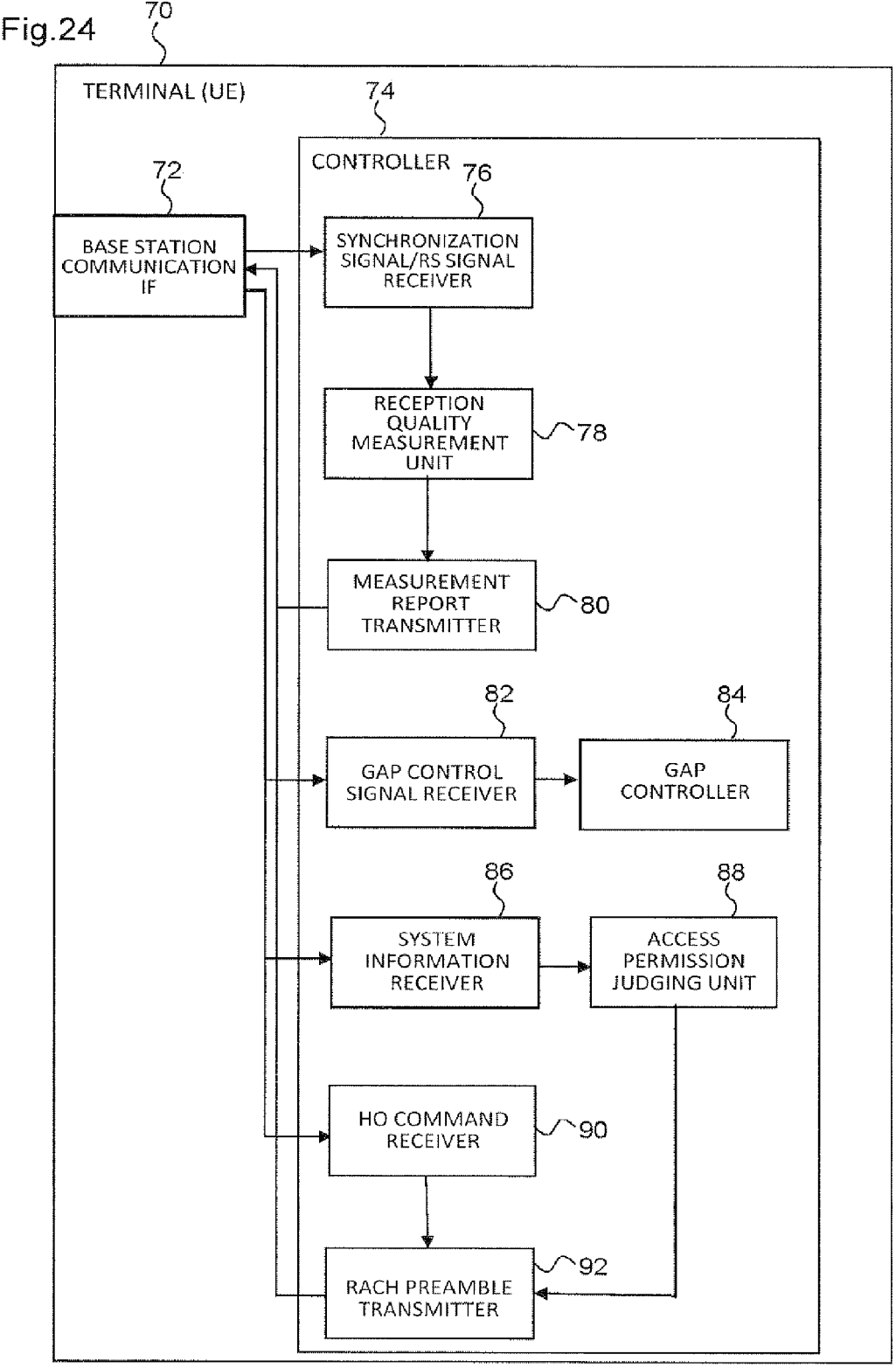
FIG. 24 is a diagram illustrating a configuration of a terminal according to the fifth embodiment.

FIG. 24 is a diagram illustrating a configuration of the terminal (UE) 70. The terminal 70 comprises a base station communication interface 72 that is a communication interface with the SeNB 10 of the macro cell C1 and the TeNB 40 of the CSG cell C2, and a controller 74 that controls communication with the SeNB 10 and the TeNB 40.

The controller 74 comprises a synchronization signal/RS signal receiver 76, a reception quality measurement unit 78 that measures reception quality, and a measurement report transmitter 80 that transmits a measurement report to the base station. The controller 74 also comprises a gap control signal receiver 82 that receives a gap control signal and a gap controller 84 that controls a gap period timing based on the gap control signal. The controller 74 further comprises a system information receiver 86 that receives a system information, an access permission judging unit 88 that judges access permission based on the system information, a handover command receiver 90 that receives a handover command, and a RACH preamble transmitter 92 that transmits a RACH preamble upon starting communication with a base station.

Figure 25:
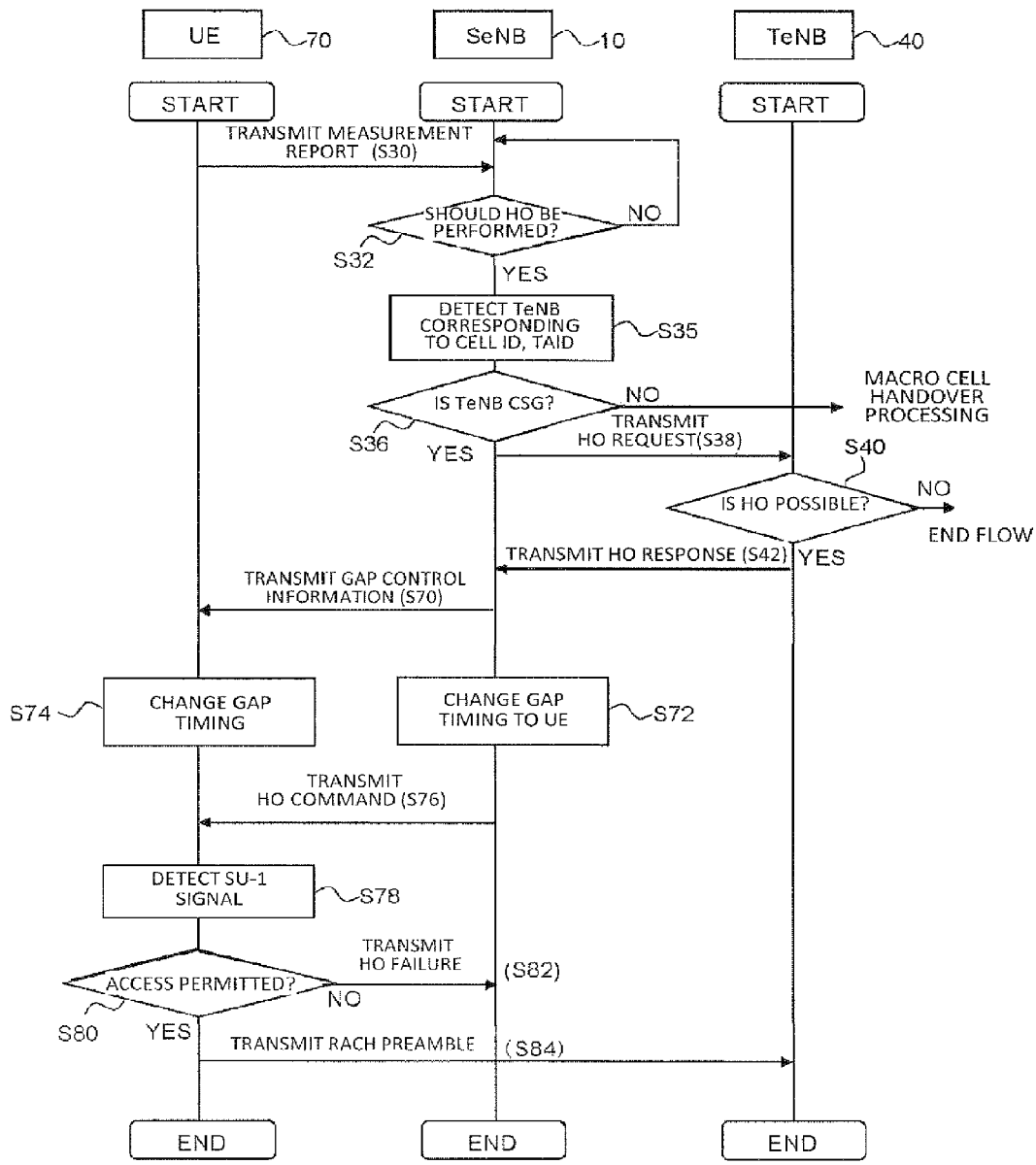
FIG. 25 is a diagram illustrating operations during a handover according to the fifth embodiment.

FIG. 25 is a flow chart illustrating operations during a handover by the radio communication system according to the fifth embodiment. The terminal 70 performs a cell search during a gap period and detects a transmission timing from the TeNB 40. The terminal 70 calculates a difference between the transmission timing from the TeNB 40 and the gap period timing, and transmits a measurement report combining the difference with a reception quality of the TeNB 40 to the SeNB 10 (S30). The SeNB 10 compares the reception quality of a radio wave from the SeNB 10 with the reception quality of a radio wave from the TeNB 40 to judge whether or not a handover should be performed (S32). When it is judged that a handover should not be performed (NO in S32), the SeNB 10 awaits the reception of a next measurement report.

When it is judged that a handover should be performed (YES in S32), the SeNB 10 extracts a TeNB 40 having an identifier corresponding to the cell ID notified in the measurement report from the NCL 16 (S35). Subsequently, when the TeNB is a CSG cell (YES in C36), the SeNB 10 transmits a handover request to the extracted TeNB 40 of the CSG cell C2 (S38). When the TeNB is not a CSG cell (NO in S36), a handover of the macro cell is performed.

The TeNB 40 having received the handover request judges whether a handover can be performed or not (S40). When a handover can be performed (YES in S40), the TeNB 40 transmits a handover response to the SeNB 10 (S42). When a handover cannot be performed (NO in S40), the radio communication system does not perform operations of step S42 and thereafter and terminates the flow.

Having received the handover response, based on a timing difference between the transmission timing of the TeNB 40 and the gap period timing notified in the measurement report, the SeNB 10 determines a changed value of the gap period timing such that a gap period of the terminal 70 matches a transmission timing of an SU-1 signal, and notifies the changed value of the gap period timing as gap control information to the terminal 70 (S70). Subsequently, the terminal 70 and the SeNB 10 simultaneously change gap period timings (S72, S74). The SeNB 10 transmits a handover command to the terminal 70 (S76).

The terminal 70 detects an SU-1 signal at the changed gap period timing (S78) and confirms whether access is permitted (S80). When the terminal 70 judges that access is permitted (YES in S80), the terminal 70 transmits a RACH preamble for starting uplink synchronization to the TeNB 40 (S84), and starts processing to connect to the TeNB 40. When the terminal 70 judges that access is not permitted (NO in S80), the terminal 70 notifies a handover failure to the SeNB 10 (S82). This concludes the description of the radio communication system according to the fifth embodiment.

Figure 26:
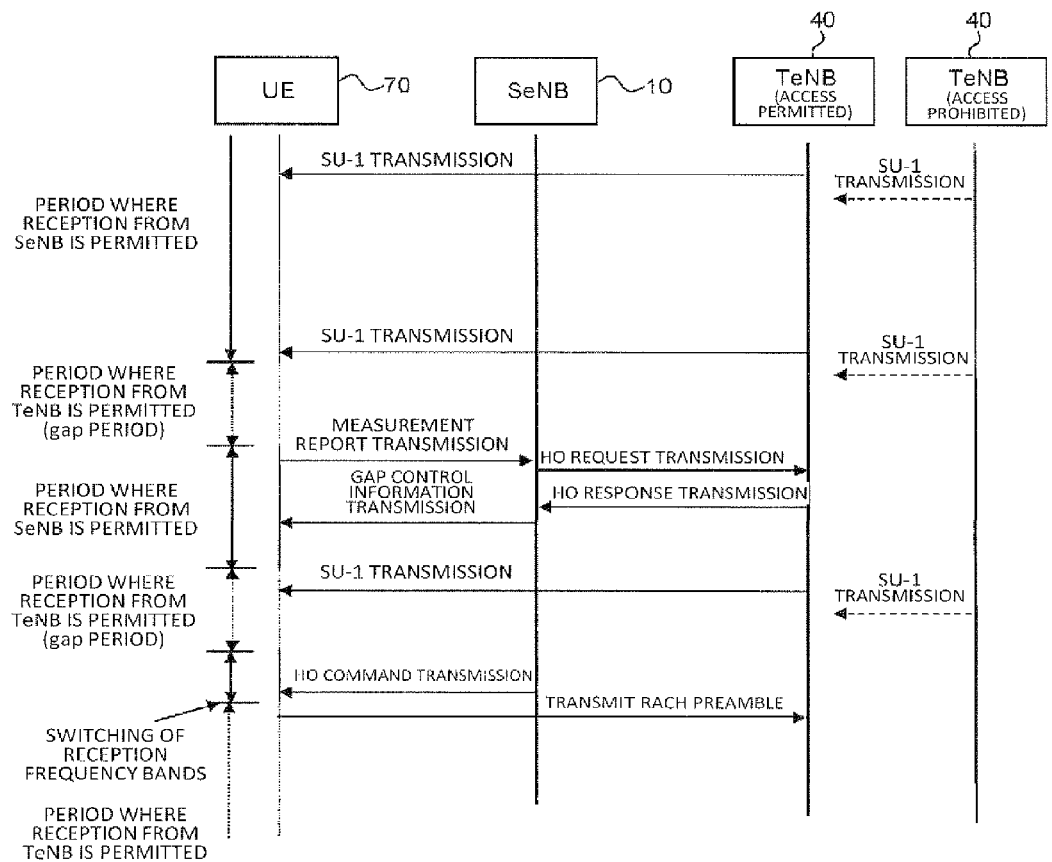
FIG. 26 is a diagram illustrating an example of a flow of signals transmitted and received during a handover according to the fifth embodiment.
Figure 27:
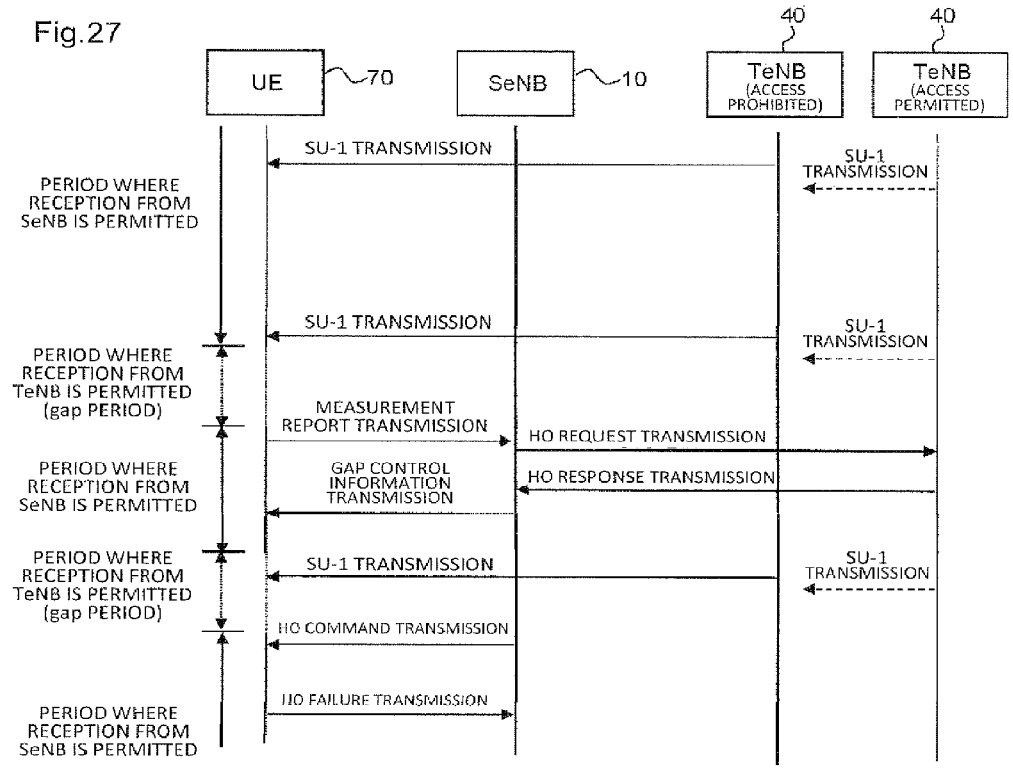
FIG. 27 is a diagram illustrating an example of a flow of signals transmitted and received during a handover according to the fifth embodiment.

FIGS. 26 and 27 are diagrams illustrating an example of a flow of signals transmitted and received during a handover by the radio communication system according to the fifth embodiment. FIG. 26 illustrates a flow of signals when the terminal 70 approaches a TeNB 40 to which access is permitted, and FIG. 27 illustrates a flow of signals when the terminal 70 approaches a TeNB 40 to which access is not permitted.

As illustrated in FIG. 26, according to the fifth embodiment, a handover can be performed in a short period of time without having to shorten the transmission interval of a system information (SU-1 signal) by the TeNB 40 that is the base station of the handover destination CSG cell and without having to extend the gap period used by the terminal 70 to receive the system information.

Sixth Embodiment

First, a background of a radio communication system according to a sixth embodiment will be described. In addition to access information of cells contained in an SU-1 signal, a system information of a base station includes an access-prohibited cell list (hereinafter referred to as "APCL") as a list of cells that prohibit access by a terminal. The APCL is notified to the terminal from a core network via the base station. A terminal having received the APCL cannot be handed over to a cell included in the list.

At present, a system where CSG cells and macro cells use different frequencies (hereunder, referred to as system 1) is being considered. In the system 1, a terminal is able to distinguish between a CSG cell and a macro cell solely by differences in frequency. On the other hand, as a future system (hereunder, referred to as system 2), a system is conceivable in which a CSG cell can be distinguished from a macro cell by cell IDs instead of frequencies. In the system 2, a terminal is able to distinguish between a CSG cell and a macro cell by cell IDs. In the system 2, a cell ID list of neighboring CSG cells is defined as a CSG cell list and notified in the form of a system information to the terminal from a core network via the base station.

If such a system should materialize, in order to maintain compatibility of system information between systems, a terminal used in the system 1 that is an existing system must be usable in the system 2 that is a future network.

As described above, since a terminal of the system 1 is not capable of distinguishing between a CSG cell and a macro cell by cell IDs, there is a possibility that the terminal may erroneously judge a CSG cell of the system 2 to be a macro cell. Generally, since the number of CSG cells having access restrictions is significantly large, attempts to access a CSG cell often result in not being able to connect to the CSG cell due to access restrictions, causing wasting of communication resources. The sixth embodiment provides a radio communication system designed to prevent wasting of communication resources when a terminal of the system 1 is used in the system 2.

Figure 28:
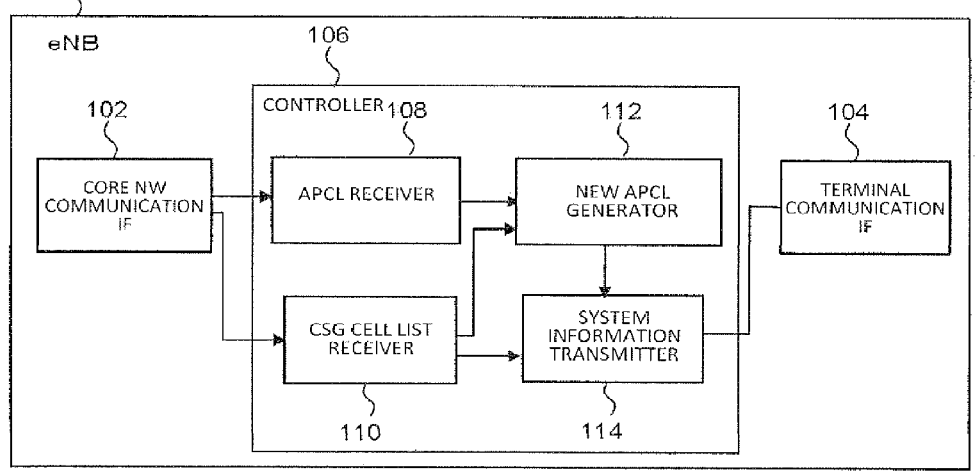
FIG. 28 is a diagram illustrating a configuration of an eNB of a system 2 according to a sixth embodiment.

Next, a radio base station and a terminal according to the sixth embodiment will be described. FIG. 28 is a diagram illustrating a configuration of a base station (an SeNB and a TeNB will be collectively referred to as an eNB) 100. The eNB 100 comprises a core NW communication interface 102 that is a communication interface with a core network, a terminal communication interface 104 that is a communication interface with a terminal 120, and a controller 106 that controls communication with the core NW and the terminal 120.

The controller 106 comprises an access-prohibited cell list receiver (hereinafter referred to as an "APCL receiver") 108, a CSG cell list receiver 110, a new access-prohibited cell list generator (hereinafter referred to as a "new APCL generator") 112, and a system information transmitter 114. Moreover, while FIG. 28 illustrates a configuration necessary for system information transmission, the eNB 100 has configurations necessary for communication control and the like in addition to the configuration described above.

The APCL receiver 108 receives an APCL from the core network and transmits the APCL to the new APCL generator 112. The CSG cell list receiver 110 receives a CSL cell list from the core network and transmits the CSL cell list to the new APCL generator 112.

FIG. 29A is a diagram illustrating an example of an APCL, and FIG. 29B is a diagram illustrating a CSG cell list. An APCL is a list of cell IDs identifying cells that do not permit access. A CSG cell list is a list indicating a range of cell IDs usable to identify a CSG cell. As illustrated in FIG. 29B, cell IDs 300 to 350 and 450 to 500 are used as CSG cell IDs. A terminal of the system 2 can identify whether a cell identified by a cell ID is a macro cell or a CSG cell based on whether the cell ID is included in these ranges.

The new APCL generator 112 loads an APCL from the APCL receiver 108 and a CSG cell list from the CSG cell list receiver 110 and generates a new APCL. The new APCL generator 112 generates a new APCL by extracting only neighboring CSG cells from the CSG cell list and adding the extracted CSG list to the APCL.

Figure 30:
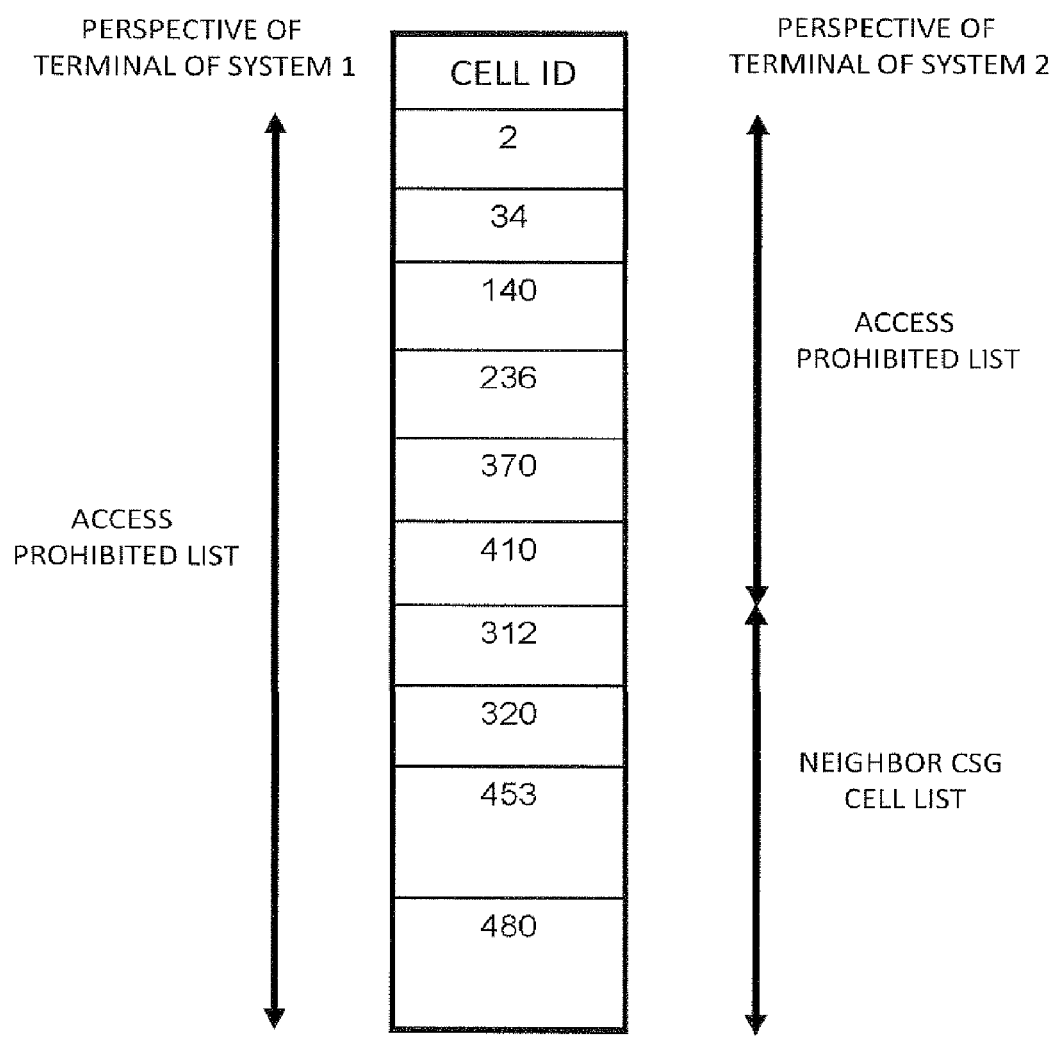
FIG. 30 is a diagram illustrating an example of a new access-prohibited cell list.

FIG. 30 is a diagram illustrating an example of a new APCL generated by the new APCL generator 112. As illustrated in FIG. 30, a new APCL contains an APCL and a neighbor CSG cell list. In this example, whether a cell ID in a new APCL indicates an access-prohibited cell or a neighbor CSG cell is determined based on whether the cell ID is included in a cell ID range defined in the CSG cell list.

Figure 31:
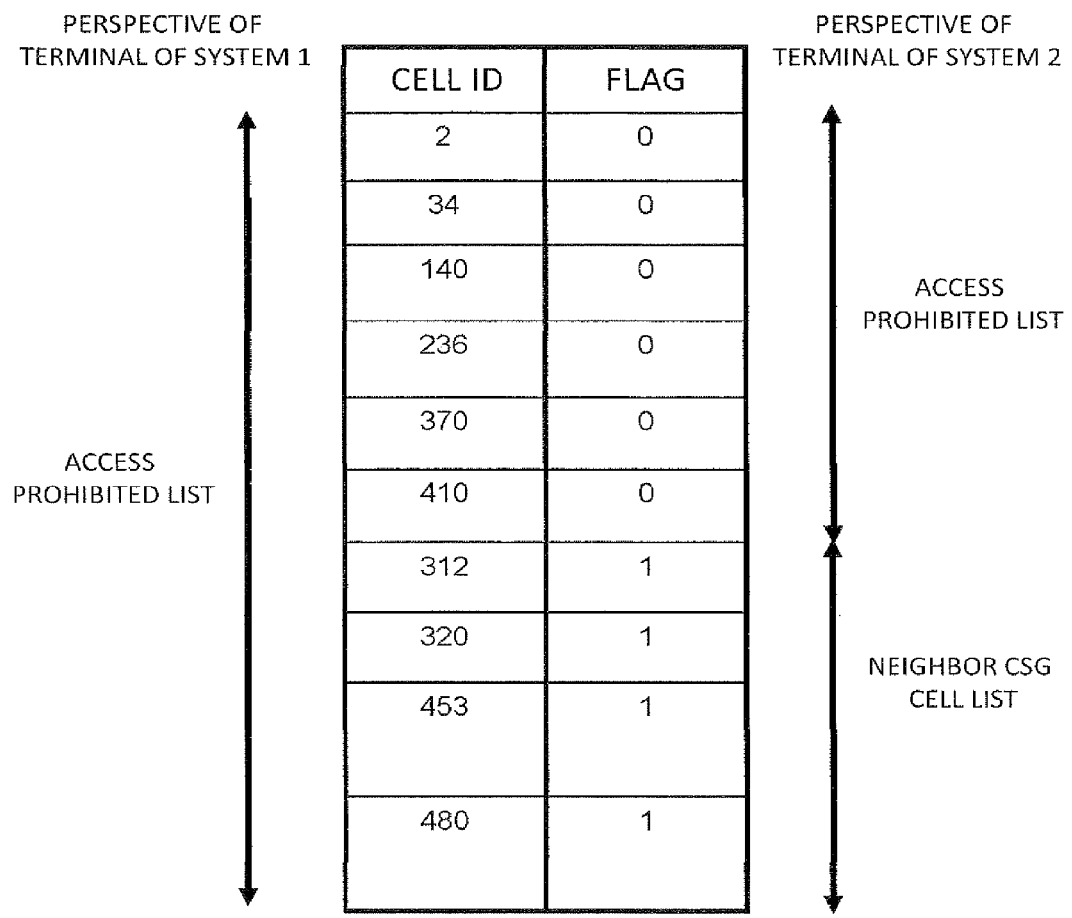
FIG. 31 is a diagram illustrating another example of a new access-prohibited cell list.

FIG. 31 is a diagram illustrating another example of a new APCL generated by the new APCL generator 112. The new APCL illustrated in FIG. 31 has flags for distinguishing between CSG cells and an APCL.

When a CSG cell list from the CSG cell list receiver 110 and a new APCL from the new APCL generator 112 are inputted, the system information transmitter 114 transmits the inputted new APCL as a system information to a terminal 120.

Figure 32:
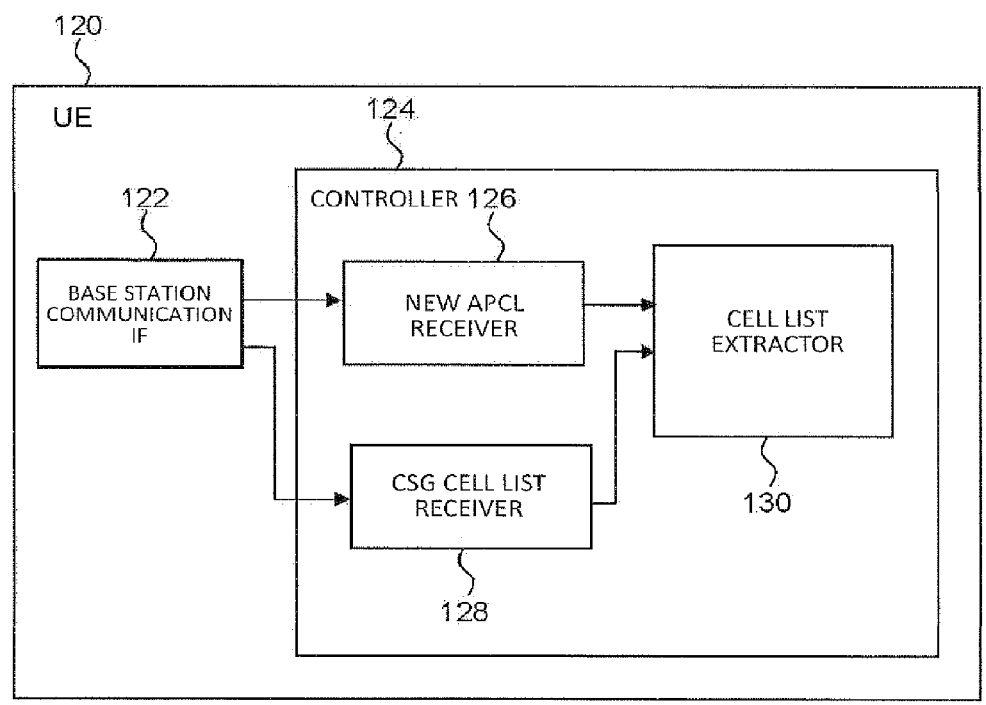
FIG. 32 is a diagram illustrating a configuration of a UE of the system 2 according to the sixth embodiment.

FIG. 32 is a diagram illustrating a configuration of the terminal (UE) 120. The terminal 120 comprises a base station communication interface 122 that is a communication interface with a base station and a controller 124 that controls communication with the base station.

The controller 124 comprises a new access-prohibited cell list receiver (hereinafter referred to as a "new APCL receiver") 126, a CSG cell list receiver 128, and a cell list extractor 130. The new APCL receiver 126 receives a new APCL from a system information transmitted from the base station. The CSG cell list receiver 128 receives a CSG cell list from the system information transmitted from the base station. Based on the inputted new APCL and CSG cell list, the cell list extractor 130 extracts an APCL and a neighbor CSG cell list. In this case, the APCL is extracted by excluding cells included in the CSG cell list from the new APCL. The neighbor CSG cell list is generated from the excluded CSG cells.

Moreover, as illustrated in FIG. 31, when flags are introduced into a new APCL, an APCL and a neighbor CSG cell list can be extracted using the flags. Moreover, while FIG. 28 illustrates a configuration necessary for APCL extraction, the terminal 120 has configurations necessary for communication control and the like in addition to the configuration described above.

Figure 33:
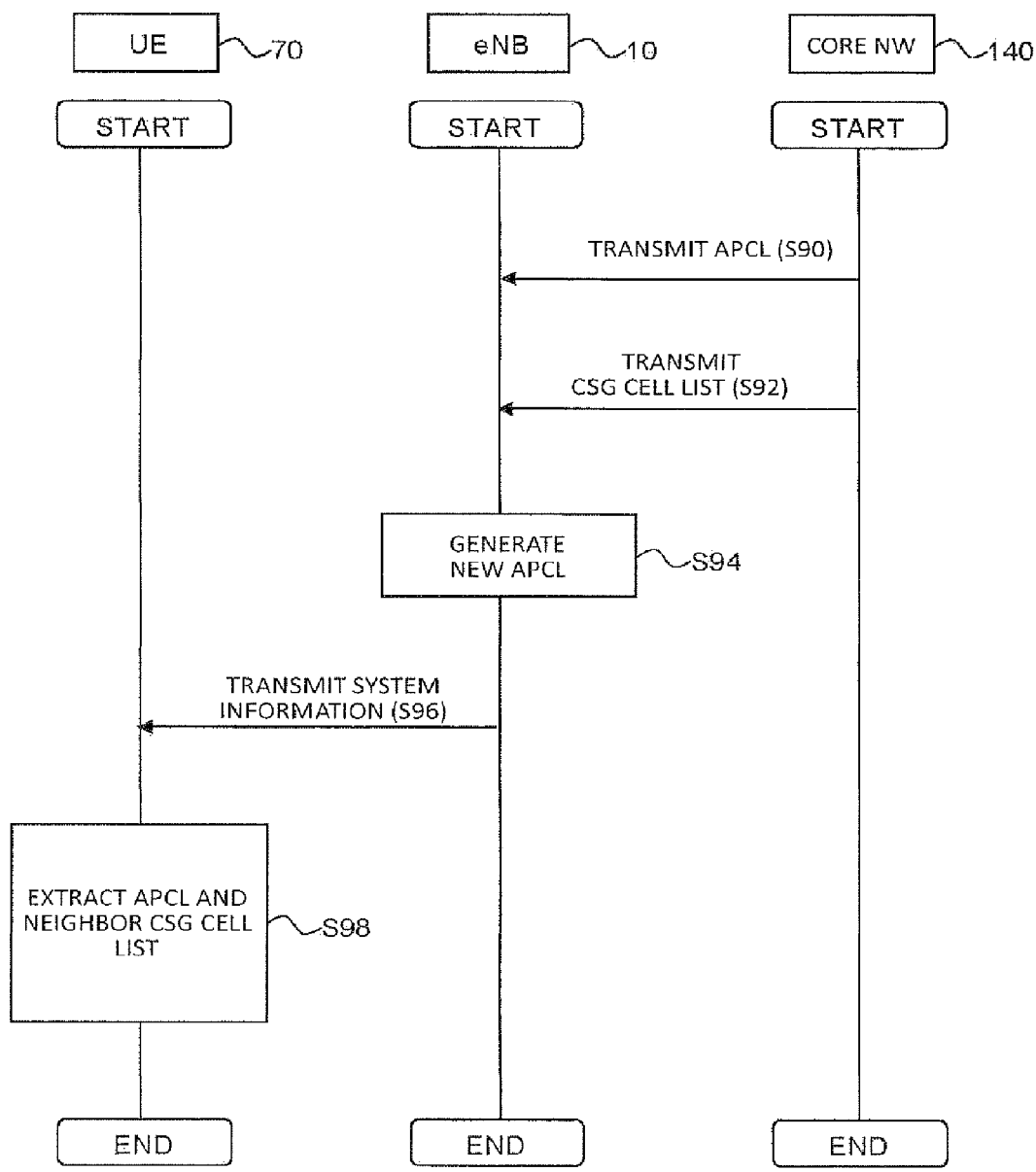
FIG. 33 is a diagram illustrating an operation for extracting an access-prohibited cell list performed by a UE of the system 2 according to the sixth embodiment.

FIG. 33 is a flow chart illustrating operations of APCL extraction of the terminal 120 in the radio communication system according to the sixth embodiment. The core network 140 transmits an APCL and a CSG cell list to the base station (eNB) 100 (S90, S92). The base station 100 generates a new APCL from the APCL and the CSG cell list (S94). The base station 100 transmits the generated new APCL as a system information to the terminal 120 (S96). The terminal 120 extracts an APCL and a neighbor CSG cell list based on the new APCL transmitted as the system information (S98). Accordingly, based on the APCL and the neighbor CSG cell list, the terminal 120 can distinguish cells to which access is permitted from cells to which access is not permitted and perform appropriate radio communication processing.

In the sixth embodiment, since a new APCL that integrates an APCL and a neighbor CSG cell list is used, an entire new APCL may appear to indicate access-prohibited cells from the perspective of a terminal of the system 1 that is incapable of identifying CSG cells and macro cells by cell IDs (refer to FIGS. 30 and 31). In other words, a terminal of the system 1 can treat a new APCL as an ordinary APCL. Accordingly, since a neighbor CSG cell of the system 2 will also be determined as an access-prohibited cell, the terminal of the system 1 can generally apply an access restriction to perform control so as not to access CSG cells that are highly likely to deny access from the terminal, thereby preventing wasting of communication resources.

As described in the above embodiment, since a terminal of the system 2 can extract an APCL and a neighbor CSG cell list from a new APCL, the terminal can perform appropriate radio communication processing using these lists.

From the above, with the sixth embodiment, a terminal of the system 1 can operate without incident in the system 2, and a terminal of the system 2 can receive an APCL and a neighbor CSG cell list without incident.

While an example in which a new APCL is transmitted to the terminal 120 as a system information has been described in the present embodiment, information for transmitting a new APCL is not limited to a system information and a new APCL may be transmitted in the form of other information.

While there has been described what is at present considered to be the preferred embodiments of the present invention, it will be understood that various modifications may be made therein, and it is intended to cover in the appended claims all such modifications as fall within the true spirit and scope of the present invention.

INDUSTRIAL APPLICABILITY

As described above, the present invention has an advantageous effect in that a handover can be performed in a short period of time and is useful for performing a handover to a cell with access restrictions such as from a macro cell to a CSG cell.

The invention claimed is:

1. A first radio communication terminal, for use in a radio communication network including a macrocell that is a first type cell and a Closed Subscribers Group (CSG) cell that is a second type cell, wherein the first radio communication terminal has an inbound mobility control function to move to the second type cell, the first radio communication terminal comprising:

a communication interface which, in operation, receives a first cell list that is used by both a second radio communication terminal, which does not have the inbound mobility control function to move to the second type cell, and the first radio communication terminal, and a second cell list that includes information about the second type cell and that is used by the first radio communication terminal but is ignored by the second radio communication terminal;

a controller, which is coupled to the communication interface and which, in operation, judges a neighboring cell to be a measurement target of reception quality measurement on the basis of the first cell list and the second cell list received via the communication interface; and a receiver which, in operation, repeatedly receives a signal containing a handover command from a target base station in the second type cell at an interval shorter than a period defined for the first radio communication terminal to monitor signals from the target base station in the second type cell.

2. The first radio communication terminal according to claim 1, wherein, when a target cell which is a handover destination candidate is the second type cell, the controller judges whether the first radio communication terminal is able to access the target cell on the basis of notification information received from the target cell, and reports a result of the accessibility judgment and a measurement result of measuring reception quality of the neighboring cell to a source base station via the communication interface.

3. The first radio communication terminal according to claim 1, wherein the second cell list includes information indicating a range of a cell ID of the second type cell.

4. The first radio communication terminal according to claim 1, which is capable of distinguishing between the first type cell and the second type cell based on cell IDs.

5. A communication method implemented by a first radio communication terminal in a radio communication network, the network including a macrocell that is a first type cell and a Closed Subscriber Group (CSG) cell that is a second type cell, wherein the first radio communication terminal has an inbound mobility control function to move to the second type cell, the method comprising the steps of:
  receiving a first cell list that is used by both a second radio communication terminal, which does not have the inbound mobility control function to move to the second type cell, and the first radio communication terminal;
  receiving a second cell list that includes information about the second type cell and that is used by the first radio communication terminal but is ignored by the second radio communication terminal;
  judging a neighboring cell to be a measurement target of reception quality measurement on the basis of the first cell list and the second cell list; and
  repeatedly receiving a signal containing a handover command from a target base station in the second type cell at an interval shorter than a period defined for the first radio communication terminal to monitor signals from the target base station in the second type cell.

6. The communication method according to claim 5, further comprising the steps of:
  when a target cell which is a handover destination candidate is the second type cell, judging whether the first radio communication terminal is able to access the target cell on the basis of notification information received from the target cell; and
  reporting a result of the accessibility judgment and a measurement result of measuring reception quality of the neighboring cell to a source base station.

7. The communication method according to claim 5, wherein the second cell list includes information indicating a range of a cell ID of the second type cell.

8. The communication method according to claim 5, wherein the first radio communication terminal is capable of distinguishing between the first type cell and the second type cell based on cell IDs.

9. A source base station in a radio communication network, the network including a macrocell that is a first type cell and a Closed Subscriber Group (CSG) cell that is a second type cell, the source base station being of the first type cell and comprising:
  a communication interface which, in operation, transmits a first cell list that is used by both a first radio communication terminal, which has an inbound mobility control function to move to the second type cell, and a second radio communication terminal, which does not have the inbound mobility control function to move to the second type cell, and a second cell list that includes information about the second type cell and that is used by the first radio communication terminal but is ignored by the second radio communication terminal; and
  a receiver, which is coupled to the communication interface and which, in operation, receives a measurement result of a neighboring cell from the first radio communication terminal, wherein the first radio communication terminal repeatedly receives a signal containing a handover command from a target base station in the second type cell at an interval shorter than a gap period defined for the first radio communication terminal to monitor signals from the target base station in the second type cell, the gap period being between two periods defined for the first radio communication terminal to monitor signals from the source base station in the first type cell.

10. The source base station according to claim 9, wherein, when a target cell which is a handover destination candidate of the first radio communication terminal is the second type cell, the communication interface receives, from the first radio communication terminal, a judgment result of whether the first radio communication terminal is able to access the target cell judged by the first radio communication terminal on the basis of notification information from the target cell, and the measurement result of the first radio communication terminal measuring reception quality of the neighboring cell.

11. The source base station according to claim 9, wherein the second cell list includes information indicating a range of a cell ID of the second type cell.

12. The base station according to claim 9, wherein the first radio communication terminal is capable of distinguishing between the first type cell and the second type cell based on cell IDs.

13. A communication method implemented by a source base station in a radio communication network, the network including a macrocell that is a first type cell and a Closed Subscriber Group (CSG) cell that is a second type cell and the source base station is of the first type cell, the method comprising the steps of:
  transmitting a first cell list that is used by both a first radio communication terminal, which has an inbound mobility control function to move to the second type cell, and a second radio communication terminal, which does not have the inbound mobility control function to move to the second type cell;
  transmitting a second cell list that includes information about the second type cell and that is used by the first radio communication terminal but is ignored by the second radio communication terminal; and
  receiving a measurement result of a neighboring cell from the first radio communication terminal, wherein the first radio communication terminal repeatedly receives a signal containing a handover command from a target base station in the second type cell at an interval shorter than a gap period defined for the first radio communication terminal to monitor signals from the target base station in the second type cell, the gap period being between two periods defined for the first radio communication terminal to monitor signals from the source base station in the first type cell.

14. The communication method according to claim 13, further comprising:
  when a target cell which is a handover destination candidate of the first radio communication terminal is the second type cell, receiving, from the first radio communication terminal, a judgment result of whether the first radio communication terminal is able to access the target cell judged by the first radio communication terminal on the basis of notification information from the target cell, and a measurement result of the first radio communication terminal measuring reception quality of the neighboring cell.

15. The communication method according to claim 13, wherein the second cell list includes information indicating a range of a cell ID of the second type cell.

16. The communication method according to claim 13, wherein the first radio communication terminal is capable of distinguishing between the first type cell and the second type cell based on cell IDs.

\* \* \* \* \*